United States Patent
Wei et al.

(10) Patent No.: US 12,254,153 B2
(45) Date of Patent: Mar. 18, 2025

(54) TOUCH PANEL AND DISPLAY APPARATUS

(71) Applicants: WUHAN TIANMA MICRO-ELECTRONICS CO., LTD., Wuhan (CN); Wuhan Tianma Microelectronics Co., Ltd. Shanghai Branch, Shanghai (CN)

(72) Inventors: Qibing Wei, Wuhan (CN); Peng Zhang, Wuhan (CN)

(73) Assignees: WUHAN TIANMA MICRO-ELECTRONICS CO., LTD., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/453,445

(22) Filed: Aug. 22, 2023

(65) Prior Publication Data
US 2023/0393685 A1 Dec. 7, 2023

(30) Foreign Application Priority Data
Apr. 3, 2023 (CN) .......................... 202310349061.8

(51) Int. Cl.
*G06F 3/041* (2006.01)
*G06F 3/044* (2006.01)

(52) U.S. Cl.
CPC ........ *G06F 3/04164* (2019.05); *G06F 3/0446* (2019.05); *G06F 3/0443* (2019.05)

(58) Field of Classification Search
None
See application file for complete search history.

(56) References Cited

U.S. PATENT DOCUMENTS

| | | | | |
|---|---|---|---|---|
| 2017/0308202 | A1* | 10/2017 | Fang | G02F 1/0316 |
| 2019/0079622 | A1* | 3/2019 | Choi | G06F 3/047 |
| 2019/0280054 | A1* | 9/2019 | Huang | G06F 1/1637 |
| 2020/0064968 | A1* | 2/2020 | Kim | H10K 59/131 |
| 2020/0110525 | A1* | 4/2020 | Park | H10K 59/131 |
| 2020/0117313 | A1* | 4/2020 | Zhang | G06F 3/0446 |
| 2020/0168671 | A1* | 5/2020 | Jang | H10K 59/40 |
| 2020/0175918 | A1* | 6/2020 | An | G09G 3/3233 |
| 2021/0090490 | A1* | 3/2021 | Lee | G06F 1/1637 |

(Continued)

FOREIGN PATENT DOCUMENTS

KR 20220110026 A * 8/2022

OTHER PUBLICATIONS

Translation KR20220110026 (Year: 2022).*

*Primary Examiner* — Dorothy Harris
(74) *Attorney, Agent, or Firm* — CHRISTENSEN O'CONNOR JOHNSON KINDNESS PLLC

(57) ABSTRACT

A touch panel and a display apparatus are provided. The touch panel includes a first component region and a touch region, first-type touch electrode blocks, and m2 first connecting lines. First and second touch regions are respectively located at two sides of the first component region along a first direction. The first-type touch electrode blocks include first touch electrode blocks in the first touch region and second touch electrode blocks in the second touch region. m1 first touch electrode groups are arranged in the first touch region along a second direction. First connecting lines are respectively electrically connected to the first touch electrode groups and the second touch electrode blocks.

20 Claims, 19 Drawing Sheets

(56) References Cited

U.S. PATENT DOCUMENTS

| | | | | |
|---|---|---|---|---|
| 2021/0096697 A1* | 4/2021 | Do | ........................ | G06F 3/0447 |
| 2021/0158743 A1* | 5/2021 | Yamashita | ............ | G09G 3/2092 |
| 2021/0357079 A1* | 11/2021 | Song | ..................... | G06F 3/0412 |
| 2022/0157860 A1* | 5/2022 | Zhu | ..................... | H01L 27/1218 |
| 2022/0317849 A1* | 10/2022 | Niu | ...................... | G06F 3/0412 |
| 2023/0133301 A1* | 5/2023 | Chen | ....................... | H10D 86/60 |
| | | | | 345/211 |
| 2023/0144469 A1* | 5/2023 | Wei | ....................... | G06F 1/1656 |
| | | | | 361/679.01 |
| 2023/0229255 A1* | 7/2023 | Kim | ..................... | G06F 3/0412 |
| | | | | 345/173 |
| 2023/0345785 A1* | 10/2023 | Feng | ................. | H10K 59/1315 |
| 2024/0264709 A1* | 8/2024 | Bok | ...................... | G06F 3/0446 |

* cited by examiner

TOUCH PANEL AND DISPLAY APPARATUS

CROSS-REFERENCE TO RELATED APPLICATION

The present application claims the benefit of Chinese Patent Application No. 202310349061.8, filed on Apr. 3, 2023, the content of which is incorporated herein by reference in its entirety.

TECHNICAL FIELD

The present disclosure relates to the technical field of touch panels, and in particular to a touch panel and a display apparatus.

BACKGROUND

With diversification of display screens, it has been proposed to provide a component such as a camera at a through hole or a blind hole in a display region of a display screen. When the display screen has a touch detection function, an avoidance design is provided for a corresponding touch electrode at the through hole or the blind hole, and an electrode block in the touch electrode is not electrically connected at the through hole or the blind hole. Therefore, how to provide the touch electrode having an extension direction passing through the through hole or the blind hole has become a focus of related research.

SUMMARY

According to a first aspect, an embodiment of the present disclosure provides a touch panel. The touch panel has a first component region and a touch region. The touch region at least partially surrounds the first component region. The touch region includes a first touch region and a second touch region. The first touch region and the second touch region are respectively located at two sides of the first component region along a first direction. The touch panel includes a plurality of first-type touch electrode blocks and first connecting lines. The plurality of first-type touch electrode blocks includes first touch electrode blocks and second touch electrode blocks. The first touch electrode blocks are located in the first touch region. The second touch electrode blocks are located in the second touch region, and m1 first touch electrode groups are arranged in the first region along a second direction, and one of the first touch electrode groups includes at least two of the first touch electrode blocks arranged along the first direction and electrically connected to each other, m1 being a positive integer greater than or equal to 2. One of the m2 first connecting lines is electrically connected to both one first touch electrode group of the first touch electrode groups and one second touch electrode block of the second touch electrode blocks, m2 being an integer greater than or equal to 0, and m2<m1.

According to a second aspect, an embodiment of the present disclosure provides a display apparatus including a touch panel. The touch panel has a first component region and a touch region. The touch region at least partially surrounds the first component region. The touch region includes a first touch region and a second touch region. The first touch region and the second touch region are respectively located at two sides of the first component region along a first direction. The touch panel includes a plurality of first-type touch electrode blocks and first connecting lines. The plurality of first-type touch electrode blocks includes first touch electrode blocks and second touch electrode blocks. The first touch electrode blocks are located in the first touch region. The second touch electrode blocks are located in the second touch region, and m1 first touch electrode groups are arranged in the first region along a second direction, and one of the first touch electrode groups includes at least two of the first touch electrode blocks arranged along the first direction and electrically connected to each other, m1 being a positive integer greater than or equal to 2. One of the m2 first connecting lines is electrically connected to both one first touch electrode group of the first touch electrode groups and one second touch electrode block of the second touch electrode blocks, m2 being an integer greater than or equal to 0, and m2<m1.

BRIEF DESCRIPTION OF DRAWINGS

To describe the technical solutions of the embodiments of the present disclosure more clearly, the following briefly describes the accompanying drawings. The accompanying drawings in the following description show some embodiments of the present disclosure, and a person of ordinary skill in the art can still derive other drawings from these accompanying drawings.

DETAILED DESCRIPTION

For a better understanding of the technical solutions of the present disclosure, the following describes in detail the embodiments of the present disclosure with reference to the accompanying drawings.

It should be noted that, the described embodiments are merely some but not all of the embodiments of the present disclosure. All other embodiments obtained by a person of ordinary skill in the art based on the embodiments of the present disclosure shall fall within the protection scope of the present disclosure.

Terms in the embodiments of the present disclosure are merely used to describe the specific embodiments, and are not intended to limit the present disclosure. Unless otherwise specified in the context, words, such as "a", "the", and "this", in a singular form in the embodiments and appended claims of the present disclosure include plural forms.

It should be understood that the term "and/or" in this specification merely describes associations between associated objects, and it indicates three types of relationships. For example, A and/or B may indicate that A alone, A and B, or B alone. In addition, the character "/" in this specification generally indicates that the associated objects are in an "or" relationship.

In the description of this specification, it should be understood that the terms such as "substantially", "approximate to", "approximately", "about", "roughly", and "in general" described in the claims and embodiments of the present disclosure mean general agreement within a reasonable process operation range or tolerance range, rather than an exact value.

It should be understood that although the terms such as first, second, and third may be used to describe regions in the embodiments of the present disclosure, these regions should not be limited to these terms. These terms are used only to distinguish the regions from each other. For example, without departing from the scope of the embodiments of the present disclosure, a first region may also be referred to as a second region, and similarly, a second region may also be referred to as a first region.

It is obvious for those skilled in the art that various modifications and changes may be made to the present disclosure without departing from the spirit or scope of the present disclosure. Therefore, the present disclosure is intended to cover the modifications and changes on the present disclosure that fall within the range of the corresponding claims (technical solutions claimed) and equivalents thereof. It should be noted that, the implementations provided in the embodiments of the present disclosure can be combined with each other if no conflict occurs.

Figure 1:
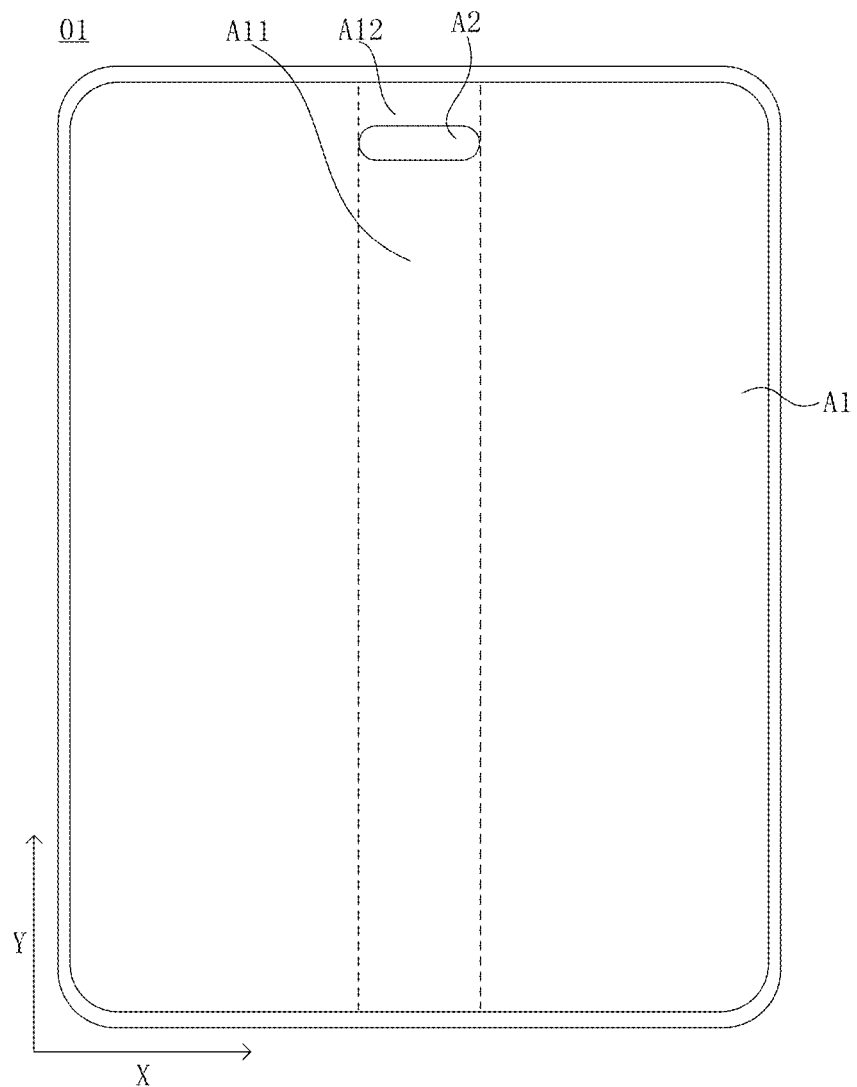
FIG. 1 is a schematic view of a touch panel according to an embodiment of the present disclosure.
Figure 2:
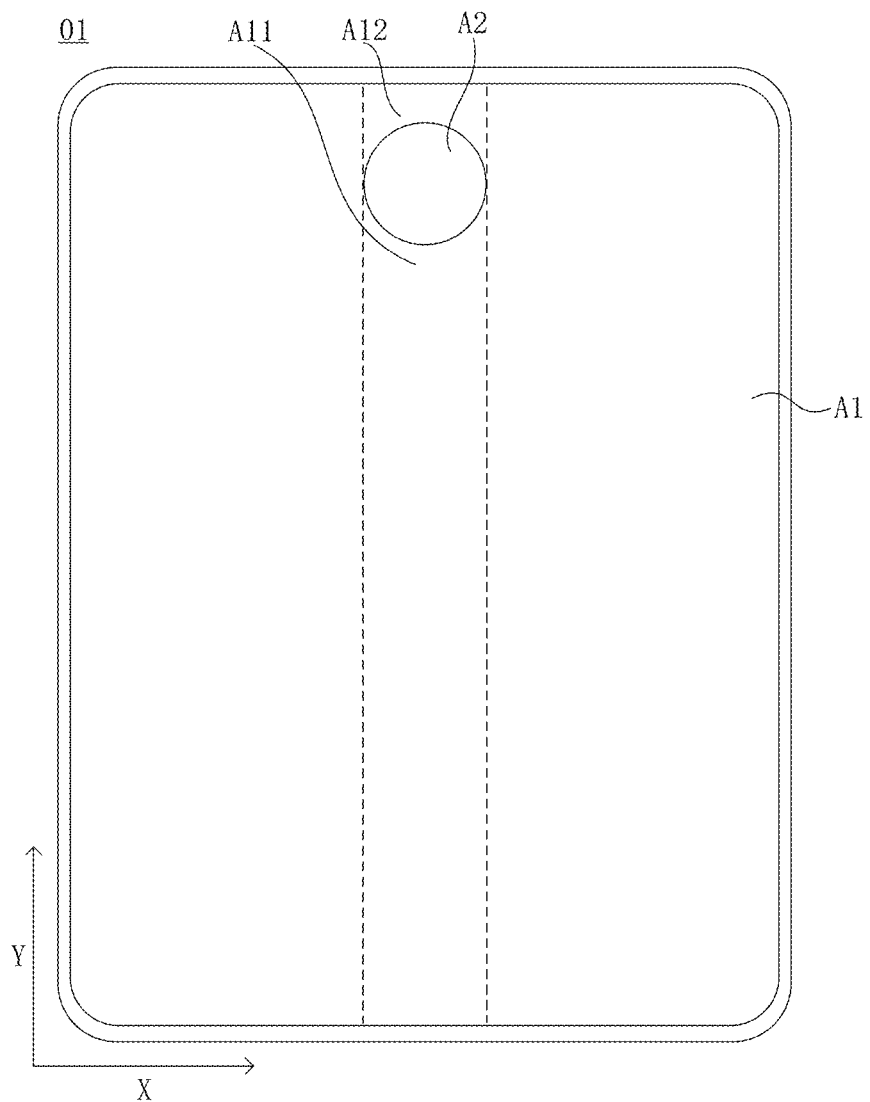
FIG. 2 is another schematic view of a touch panel according to an embodiment of the present disclosure.

FIG. 1 is a schematic view of a touch panel according to an embodiment of the present disclosure. FIG. 2 is another schematic view of a touch panel according to an embodiment of the present disclosure.

As shown in FIG. 1 and FIG. 2, a touch panel 01 provided by the embodiment of the present disclosure includes a touch region A1 and a first component region A2. The touch region A1 refers to a region for realizing touch detection in the touch panel 01. The first component region A2 is mainly configured to provide an optical component. For example, an optical sensor, a camera, a face recognition sensor, a flash lamp, a light source (torch) and the like may be provided under the first component region A2.

In order that the optical component at the first component region A2 can receive light rays from the outside or emit light rays to the outside, a transmittance of the first component region A2 for the light rays should satisfy a preset condition. Hence, the first component region A2 usually excludes main structures (such as touch electrode blocks) for realizing the touch detection. Particularly, when a touch electrode is a metal grid structure, the touch electrode blocks may not be provided in the first component region A2.

In the embodiment of the present disclosure, the first component region A2 may be provided in various ways. For example, the first component region A2 includes a through hole or a blind hole. The through hole penetrates through the touch panel 01 along a thickness direction of the touch panel 01. It may be obtained by cutting the touch panel 01. The blind hole does not penetrate through the touch panel 01 along the thickness direction of the touch panel 01. It may be obtained by keeping main structures for realizing the touch detection away from the first component region A2.

A width of the first component region A2 along a second direction X may be greater than a width along a first direction Y. The second direction X is perpendicular to the first direction Y. As shown in FIG. 1, the second direction X may be a row direction, and the first direction Y may be a column direction. A width of the first component region A2 along the row direction is greater than a width along the column direction.

A width of the first component region A2 along a second direction X may be equal to a width along a first direction Y. The second direction X is perpendicular to the first direction Y. As shown in FIG. 2, the second direction X may be a row direction, and the first direction Y may be a column direction. A width of the first component region A2 along the row direction is equal to a width along the column direction.

In some embodiments, a width of the first component region A2 along a second direction X may also be less than a width along a first direction Y.

As shown in FIG. 1 and FIG. 2, the touch region A1 at least partially surrounds the first component region A2, namely at least a part of the first component region A2 is connected to the touch region A1. For example, as shown in FIG. 1 and FIG. 2, the touch region A1 completely surrounds the first component region A2. In some cases, the touch region A1 may also partially surround the first component region A2.

Referring to FIG. 1 and FIG. 2, the touch region A1 includes a first touch region A11 and a second touch region A12. The first touch region A11 and the second touch region A12 are respectively located at two sides of the first component region A2 along the first direction Y. It is to be understood that two regions located at the two relative sides of the first component region A2 in the touch region A1 and arranged with the first component region A2 along the first direction Y can be respectively referred to as the first touch region A11 and the second touch region A12.

A width of the first touch region A11 along the second direction X may be equal to a width of the second touch region A12 along the second direction X, and both the width of the first touch region A11 and the width of the second touch region A12 along the second direction X may be equal to or slightly greater than the width of the first component region A2 along the second direction X.

Figure 3:
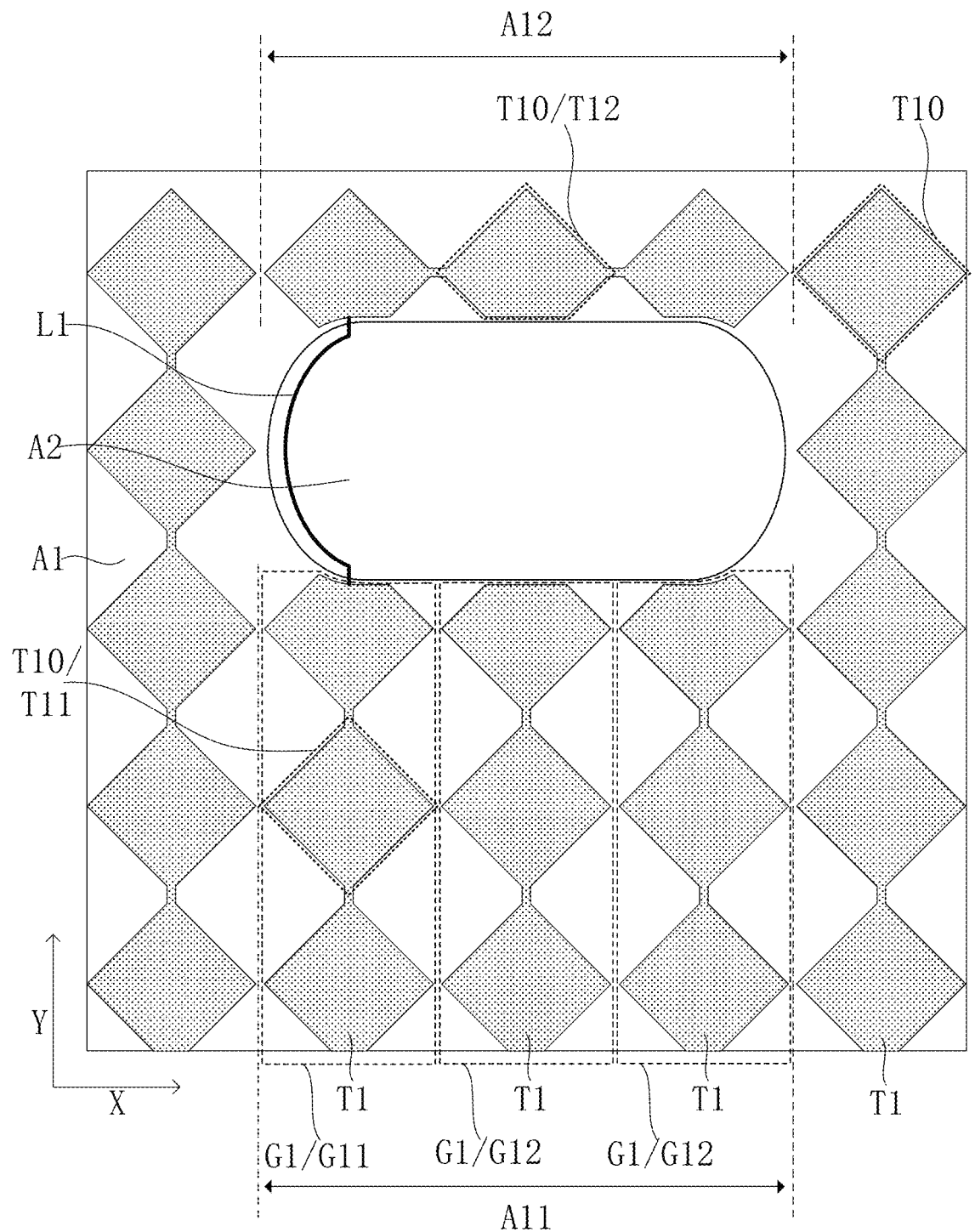
FIG. 3 is a schematic partial view of the touch panel shown in FIG. 1 according to an embodiment of the present disclosure.
Figure 4:
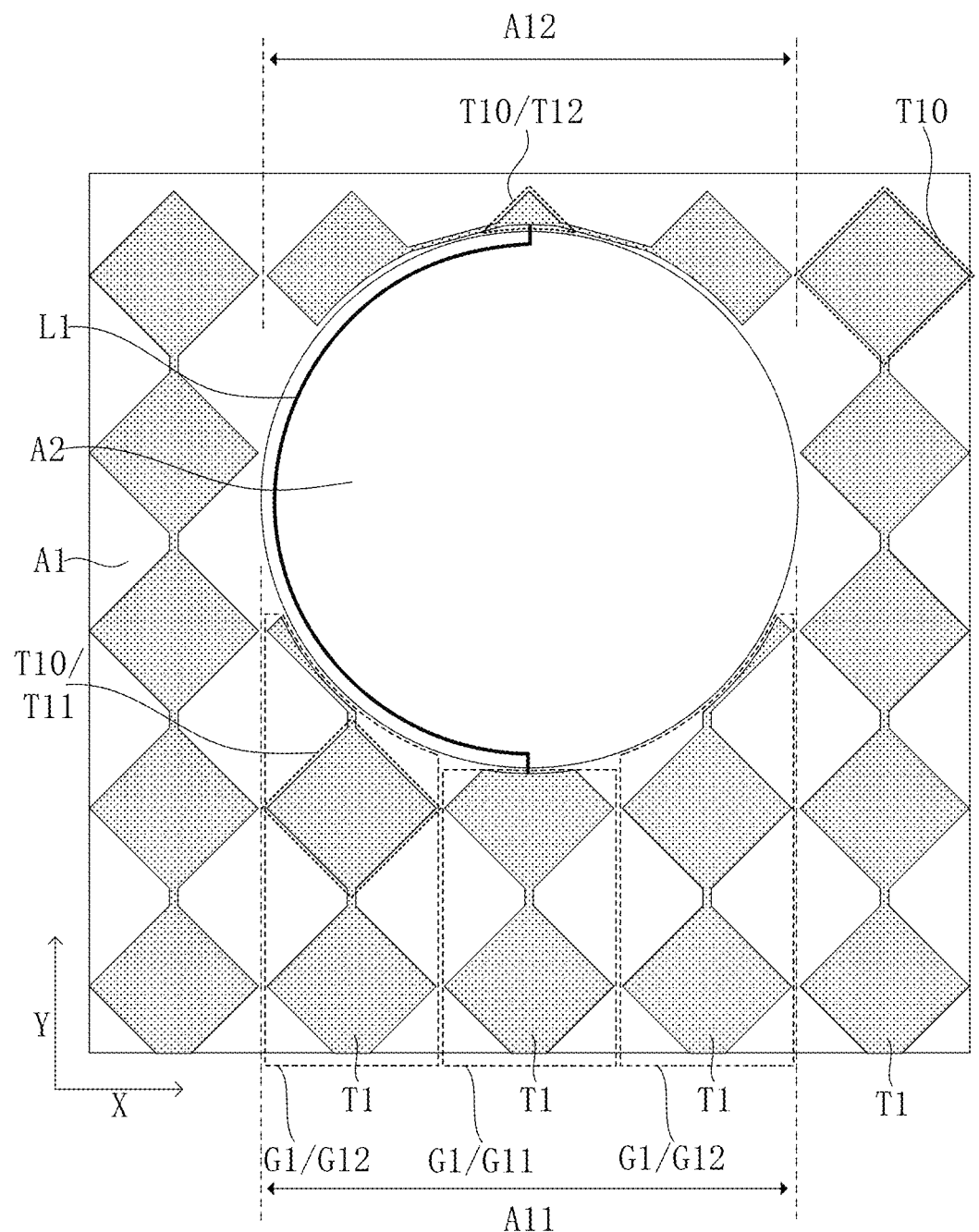
FIG. 4 is a schematic partial view of the touch panel shown in FIG. 2 according to an embodiment of the present disclosure.

FIG. 3 is a schematic partial view of the touch panel shown in FIG. 1. FIG. 4 is a schematic partial view of the touch panel shown in FIG. 2.

Referring to FIG. 1 and FIG. 3, and FIG. 2 and FIG. 4, the touch panel 01 includes a plurality of first-type touch electrode blocks T10. The first-type touch electrode blocks T10 are one of the main structures for realizing the touch detection. The plurality of first-type touch electrode blocks T10 are functionally identical touch electrode blocks in the touch detection. For example, the plurality of first-type touch electrode blocks T10 are configured to receive and transmit a touch driving signal. In an embodiment, the plurality of first-type touch electrode blocks T10 are configured to receive and transmit a touch sensing signal. Specifically, the first-type touch electrode blocks T10 each may be a touch driving electrode block, or the first-type touch electrode blocks T10 each may also be a touch sensing electrode block.

The first-type touch electrode blocks T10 of the touch panel 01 include first touch electrode blocks T11 and second touch electrode blocks T12. The first touch electrode blocks T11 are located in the first touch region A11. The second touch electrode blocks T12 are located in the second touch region A12. In other words, the first-type touch electrode blocks T10 are arranged in the first touch region A11 and the second touch region A12. According to positions of the first-type touch electrode blocks T10, the plurality of first-type touch electrode blocks T10 are divided into at least two categories: one category is the first touch electrode blocks T11 and is located in the first touch region A11; and the other category is the second touch electrode blocks T12 and is located in the second touch region A12.

Referring to FIG. 3 and FIG. 4, the first touch region A11 includes m1 first touch electrode groups G1 arranged along the second direction X, and the first touch electrode groups G1 each include at least two of the first touch electrode blocks T11 arranged along the first direction Y and electrically connected to each other, m1 being a positive integer greater than or equal to 2. For example, referring to FIG. 3 and FIG. 4, m1=3, namely the first touch region A11 includes three first touch electrode groups G1 arranged along the row direction. The first touch electrode groups G1 each include at least two first touch electrode blocks T11 arranged along the first direction Y and electrically connected to each other.

Referring to FIG. 3 and FIG. 4, the touch panel 01 further includes first connecting lines L1. The first connecting lines L1 are respectively electrically connected to the first touch electrode groups G1 and the second touch electrode blocks T12, namely the first connecting line L1 is configured to electrically connect the first touch electrode group G1 in the first touch region A11 and the second touch electrode block T12 in the second touch region A12 together.

There are m2 first connecting lines L1, m2 being an integer greater than or equal to 0, and m2<m1. In the embodiment of the present disclosure, a number of the first connecting lines L1 for electrically connecting the first touch electrode groups G1 in the first touch region A11 and the second touch electrode blocks T12 in the second touch region A12 is less than a number of the first touch electrode groups G1 in the first touch region A11. It can be understood that at least one of the first touch electrode groups G1 in the first touch region A11 is not electrically connected to the second touch electrode block T12 in the second touch region A12.

In the embodiment of the present disclosure, the number of the first connecting lines L1 is less than the number of the first touch electrode groups G1 in the first touch region A11. With the less first connecting lines L1, the present disclosure can make the first connecting lines L1 laid more easily.

When the touch panel 01 includes the first component region A2, an avoidance design is provided for the first-type touch electrode blocks T10 in the first component region A2, namely the first-type touch electrode blocks T10 may not be provided in the first component region A2. In this case, for the sake of the avoidance for the first component region A2, at least one of the first-type touch electrode blocks T10 close to the first component region A2 differs from a common one of the first-type touch electrode blocks T10 in shape. For example, referring to FIG. 3 and FIG. 4, the common first-type touch electrode block T10 is square, and at least one of the first-type touch electrode blocks T10 at a periphery of the first component region A2 is irregular.

In addition, a ratio of the width of the first component region A2 along the first direction Y to a width of the common first-type touch electrode block T10 along the first direction Y is about 1-3. For example, the ratio of the width of the first component region A2 along the first direction Y to the width of the common first-type touch electrode block T10 along the first direction Y is about 1. Or, the ratio of the width of the first component region A2 along the first direction Y to the width of the common first-type touch electrode block T10 along the first direction Y is about 1.5. In an embodiment, the ratio of the width of the first component region A2 along the first direction Y to the width of the common first-type touch electrode block T10 along the first direction Y is about 2.

In the touch panel 01, the first-type touch electrode blocks T10 are usually arranged in an array. Although the avoidance design is provided for the first-type touch electrode blocks T10 in the first component region A2, a number of columns of first-type touch electrode blocks T10 along the second direction X in the second touch region A12 is usually the same as a number of columns of the first-type touch electrode blocks T10 along the second direction X in the first touch region A11. That is, a number of columns of the second touch electrode blocks T12 along the second direction X in the second touch region A12 may be the same as the number of the first touch electrode groups G1 in the first touch region A11, and both numbers are m1.

In the embodiment of the present disclosure, as shown in FIG. 3 and FIG. 4, there are at least two columns of the second touch electrode blocks T12 along the second direction X in the second touch region A12. At least adjacent ones of the second touch electrode blocks T12 along the second direction X in the second touch region A12 are electrically connected to each other. By electrically connecting at least adjacent ones of the second touch electrode blocks T12 along the second direction X in the second touch region A12, a number of signal lines for transmitting a signal to these second touch electrode blocks T12 can be reduced, for example, the number of the first connecting lines L1 can be reduced. In some embodiments, at a side of the first touch electrode group G1 away from the first component region A2, the first touch electrode group G1 is electrically connected to a pin pad (touch pin) of an integrated circuit (IC) on the touch panel, namely, a touch signal in the IC is accessed to the side of the first touch electrode group G1 away from the first component region A2.

In a technical solution of the present disclosure, referring to FIG. 3 and FIG. 4, the second touch electrode blocks T12 in the second touch region A12 are electrically connected to the first touch electrode group G1 in the first touch region A11 through the first connecting line L1, namely m2>0. The second touch electrode blocks T12 along the second direction X in the second touch region A12 are electrically connected. The second touch electrode blocks T12 electrically connected to one of the first touch electrode groups G1 in the first touch region A11 are located in different columns.

Therefore, the number of the first connecting lines L1 can be reduced. In some embodiments, the second touch electrode blocks T12 each are electrically connected to a predetermined number (such as one or more) of the first touch electrode groups G1 through one of the first connecting lines L1.

In the technical solution, referring also to FIG. 3 and FIG. 4, the at least two first touch electrode groups G1 in the first touch region A11 include first touch electrode A groups G11. The first touch electrode A groups G11 are electrically connected to the second touch electrodes T12 in the second touch region A12 through the first connecting lines L1. Since the number of the first connecting lines L1 is less than the number of the first touch electrode groups G1, the at least two first touch electrode groups G1 in the first touch region A11 further include the first touch electrode groups G1 not electrically connected to the second touch electrodes T12 in the second touch region A12. That is, the at least two first touch electrode groups G1 in the first touch region A11 may further include first touch electrode B groups G12. The first touch electrode B groups G12 are not electrically connected to the second touch electrodes T12 in the second touch region A12 through the first connecting lines L1.

When at least adjacent ones of the second touch electrode blocks T12 along the second direction X in the second touch region A12 are electrically connected to each other, the second touch electrode blocks T12 adjacent along the second direction X and electrically connected to each other are electrically connected to the first touch electrode A groups G11 through the first connecting lines L1. For example, as shown in FIG. 3 and FIG. 4, the second touch region A12 includes three second touch electrode blocks T12 along the second direction X. The three second touch electrode blocks T12 are electrically connected together, and electrically connected to one of the first touch electrode A groups G11 through the first connecting line L1.

Compared with the solution in which the second touch electrode blocks T12 along the second direction X in the second touch region A12 are respectively electrically connected to the different first touch electrode groups G1 in the first touch region A11 through the connecting lines, the technical solution can reduce the number of the first connecting lines L1 for electrically connecting the first touch electrode blocks T11 and the second touch electrode blocks T12, and makes the first connecting lines L1 less wound.

Figure 5:
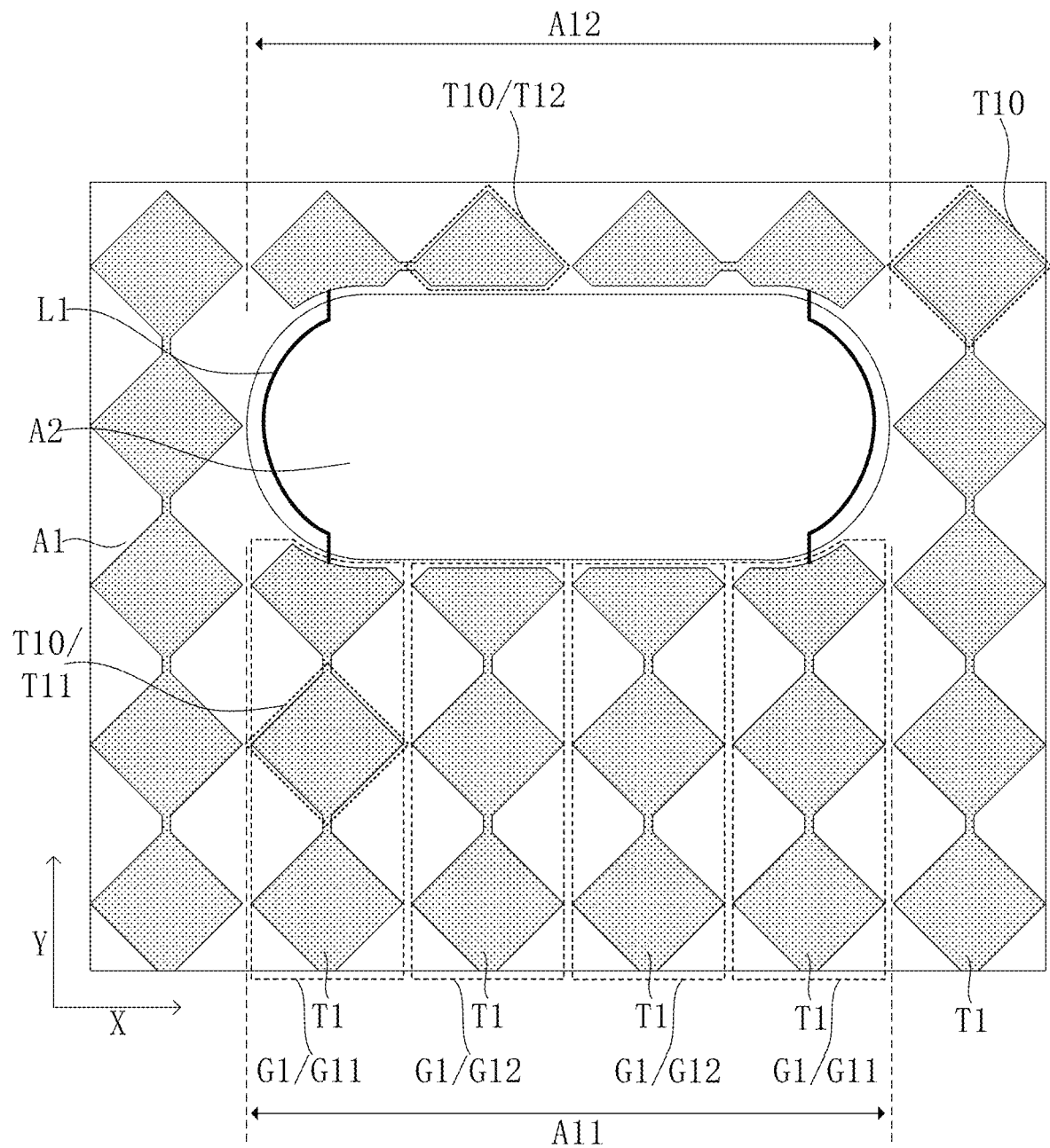
FIG. 5 is a schematic partial view of the touch panel shown in FIG. 1 according to an embodiment of the present disclosure.

FIG. 5 is a schematic partial view of the touch panel shown in FIG. 1.

In a technical solution of the present disclosure, referring to FIG. 5, different first touch electrode A groups G11 each are electrically connected to a same number of the second touch electrode blocks T12. That is, for a plurality of the first touch electrode A groups G11 electrically connected to the second touch electrode blocks T12 in the second touch region A12, the number of the second touch electrode blocks T12 electrically connected to each of the first touch electrode A groups G1 is the same.

For example, referring to FIG. 5, the first touch region A11 includes four first touch electrode groups G1 along the second direction X, and the second touch region A12 includes fourth second touch electrode blocks T12 along the second direction X. In the four first touch electrode groups G1 and the fourth second touch electrode blocks T12, two left second touch electrode blocks T12 are electrically connected to a left first touch electrode group G1 through the first connecting line L1, and two right second touch electrode blocks T12 are electrically connected to a right first touch electrode group G1 through the first connecting line L1. In the four first touch electrode groups G1, the left first touch electrode group G1 and the right first touch electrode group G1 are the first touch electrode A groups G11. The two first touch electrode A groups G11 each are electrically connected to two second touch electrode blocks T12.

When at least adjacent ones of the second touch electrode blocks T12 along the second direction X in the second touch region A12 are electrically connected to each other, the different first touch electrode A groups G11 each are electrically connected to a same number of the second touch electrode blocks T12. In the second touch region A12, a number of the second touch electrode blocks T12 electrically connected together and electrically connected to the first touch electrode A group G11 is a constant value.

Since different first touch electrode A groups G11 each are electrically connected to a same number of the second touch electrode blocks T12, first touch electrodes T1 formed by the different first touch electrode A groups G11 and the electrically connected second touch electrode blocks T12 have a same touch performance. Meanwhile, the first touch electrodes T1 including different numbers of the first-type first touch electrode blocks T10 are less classified, the difference between different regions of the touch panel 01 in touch performance is reduced, and the first touch electrodes T1 including the different numbers of the first-type first touch electrode blocks T10 are compensated easily. The electrically connected first-type first touch electrode blocks T10 form the first touch electrodes T1.

It is to be noted that in the following views for describing the inventive concept of the present disclosure, the width of the first component region A2 along the second direction X in the touch panel 01 may be greater than the width along the first direction Y. However, there are no specific limits made on a shape of the first component region A2 in the present disclosure. For example, the inventive concept of the present disclosure is also applied to the touch panel 01, in which the width of the first component region A2 along the second direction X may be equal to or less than the width along the first direction Y.

Figure 6:
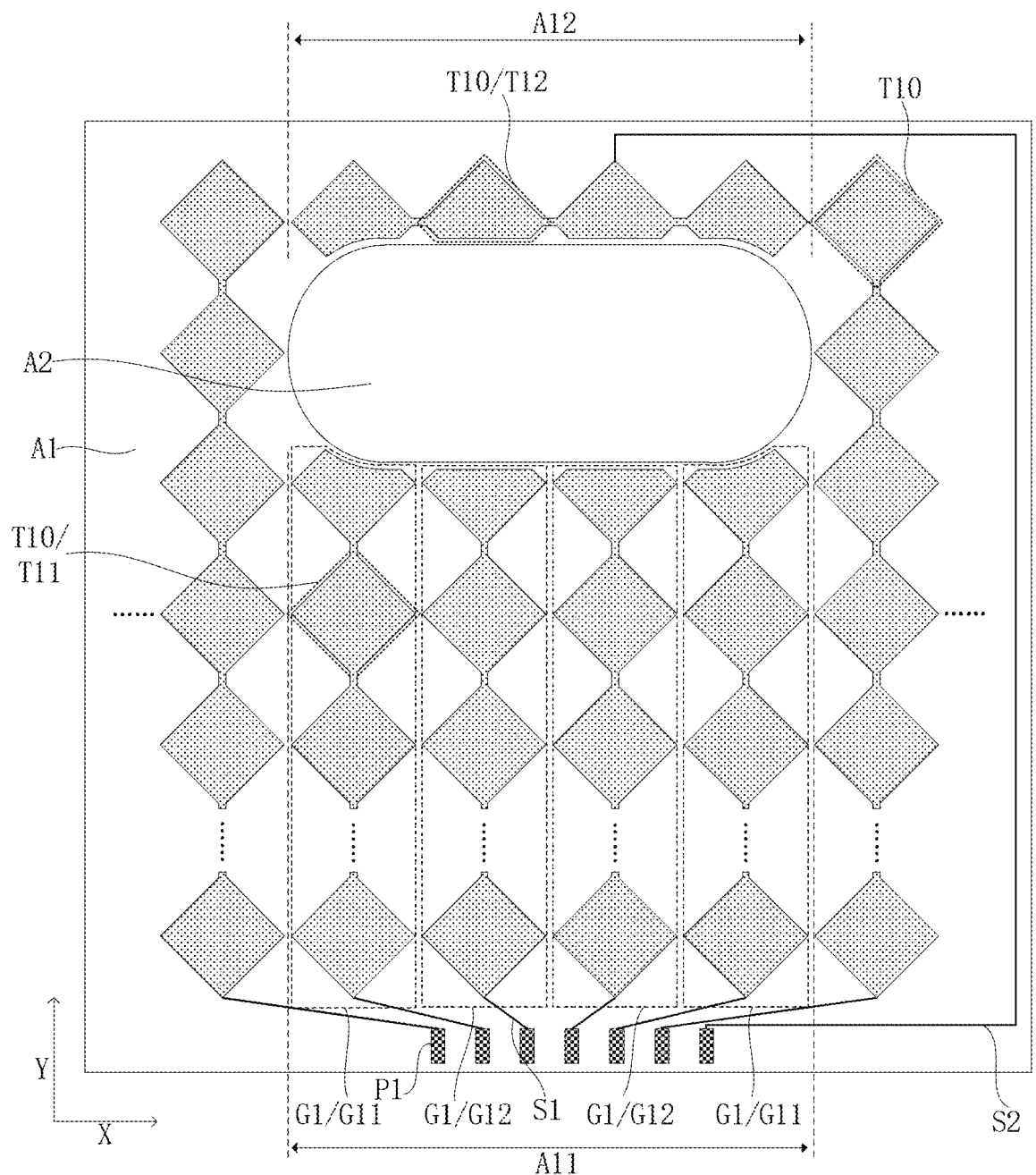
FIG. 6 is another schematic view of a touch panel according to an embodiment of the present disclosure.
Figure 7:
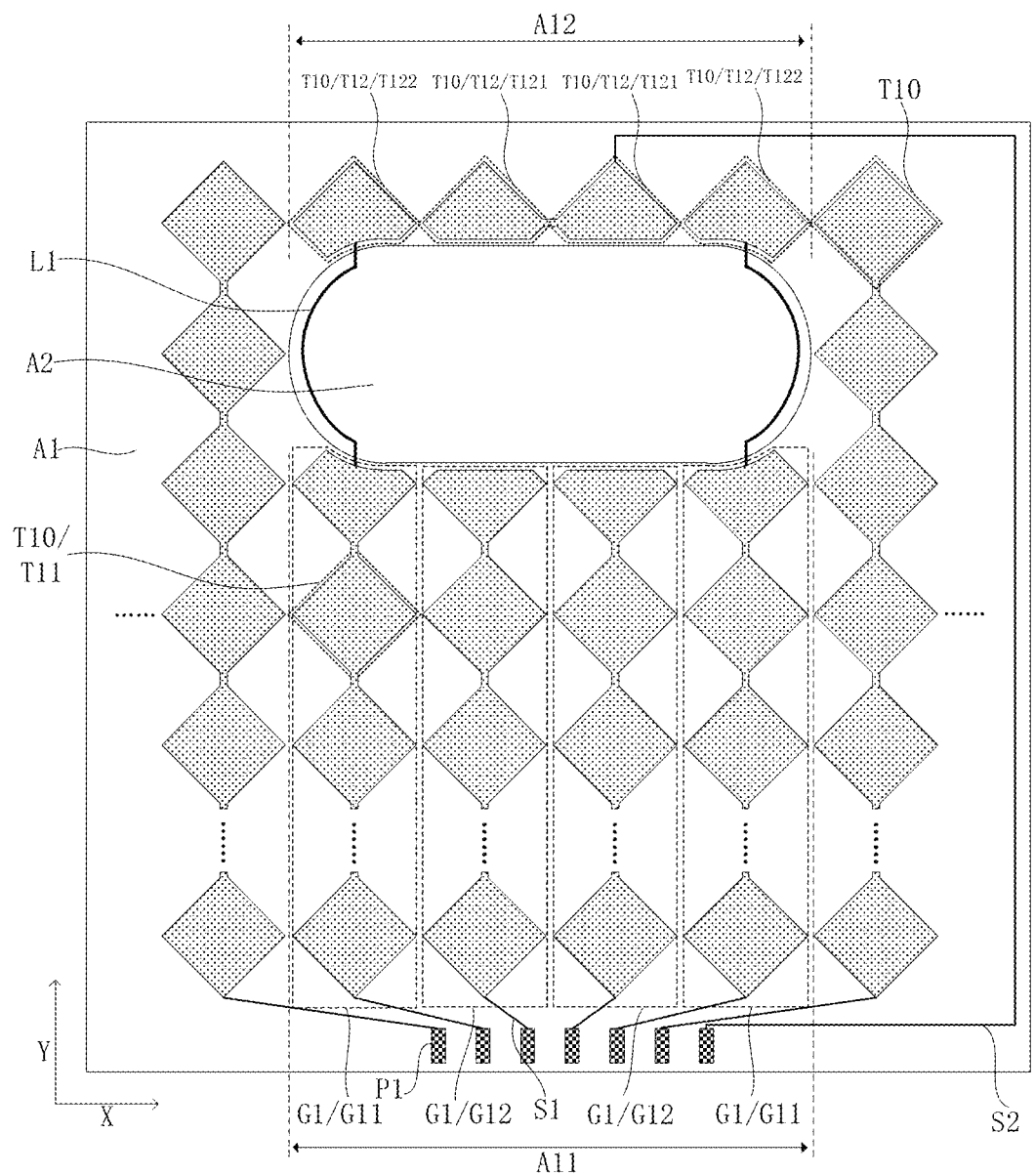
FIG. 7 is another schematic view of a touch panel according to an embodiment of the present disclosure.

FIG. 6 is another schematic view of a touch panel according to an embodiment of the present disclosure. FIG. 7 is another schematic view of a touch panel according to an embodiment of the present disclosure.

In an embodiment of the present disclosure, as shown in FIG. 6 and FIG. 7, the touch panel 01 further includes a plurality of first touch pins P1. At least one of the first touch pins P1 electrically connected to the second touch electrode blocks T12 differs from the first touch pins P1 electrically connected to the first touch electrode groups G1. That is, at least one of the second touch electrode blocks T12 in the second touch region A12 is not electrically connected to the first touch electrode group G1. The first touch pin P1 electrically connected to the second touch electrode block T12 not electrically connected to the first touch electrode group G1 differs from the first touch pin P1 electrically connected to the first touch electrode group G1.

When at least one of the second touch electrode blocks T12 in the second touch region A12 is electrically connected to the first touch electrode group G1, the first touch electrode group G1 and the second touch electrode block T12 electrically connected to each other are electrically connected to the same first touch pin P1.

In the embodiment of the present disclosure, at least one of the second touch electrode blocks T12 in the second touch region A12 is not electrically connected to the first touch electrode group G1 in the first touch region A11. Therefore, while there are a small number of the first connecting lines L1, loads on the first touch electrode groups G1 are not increased excessively.

In a technical solution of the present disclosure, referring to FIG. 6, m2=0, namely the second touch electrode blocks T12 in the second touch region A12 each are not electrically connected to the first touch electrode groups G1, and there is no first connecting line L1.

In the technical solution, in order that the second touch electrode block T12 can receive a signal or transmit a signal to the outside, the second touch electrode block T12 is electrically connected to the first touch pin P1. In the technical solution, all of the first touch pins P1 electrically connected to the second touch electrode blocks T12 differ from any one of the first touch pins P1 electrically connected to the first touch electrode groups G1. For example, as shown in FIG. 6, the first touch electrode group G1 is electrically connected to the first touch pin P1 through a first touch line S1. The second touch electrode block T12 is electrically connected to the first touch pin P1 through a second touch line S2. Different touch lines are connected to different first touch pins P1.

In a technical solution of the present disclosure, referring to FIG. 7, m2>0, namely at least one of the second touch electrode blocks T12 in the second touch region A12 is electrically connected to the first touch electrode group G1 through the first connecting line L1, and the number of the first connecting lines L1 is greater than 0.

In an embodiment of the present disclosure, as shown in FIG. 7, at least one of the first touch pins P1 electrically connected to the second touch electrode blocks T12 differ from any one of the first touch pins P1 electrically connected to the first touch electrode groups G1. Another at least one of the first touch pins P1 electrically connected to the second touch electrode blocks T12 is the same as at least one of the first touch pins P1 electrically connected to the first touch electrode groups G1.

As shown in FIG. 7, the second touch electrode blocks T12 include first touch electrode sub-blocks T121 and second touch electrode sub-blocks T122. The first touch pins P1 electrically connected to the first touch electrode sub-blocks T121 differ from any one of the first touch pins P1 electrically connected to the first touch electrode groups G1. The first touch pins P1 electrically connected to the second touch electrode sub-blocks T122 are the same as the first touch pins P1 electrically connected to the first touch electrode groups G1.

For example, as shown in FIG. 7, the second touch region A12 includes four second touch electrode blocks T12 along the second direction X. Two second touch electrode blocks T12 in the middle serve as the first touch electrode sub-blocks T121. The first touch pins P1 electrically connected to the two second touch electrode blocks T12 differ from any one of the first touch pins P1 electrically connected to the first touch electrode groups G1. Two second touch electrode blocks T12 at the edge serve as the second touch electrode sub-blocks T122. The first touch pins P1 electrically connected to the two second touch electrode blocks T12 are the same as the first touch pins P1 electrically connected to the two first touch electrode groups G1.

In an implementation, in the second touch electrode blocks T12 electrically connected to the same first touch pins P1 with the first touch electrode groups G1, the second touch electrode blocks T12 are electrically connected to the first touch electrode groups G1 through the first connecting lines L1. That is, the second touch electrode sub-blocks T122 are electrically connected to the first touch electrode groups G1 through the first connecting lines L1.

For example, as shown in FIG. 7, the second touch region A12 includes four second touch electrode blocks T12 along the second direction X. Two second touch electrode blocks T12 at the edge serve as the second touch electrode sub-blocks T122. The first touch pins P1 electrically connected to the two second touch electrode blocks T12 are the same as the first touch pins P1 electrically connected to the two first touch electrode groups G1. The two second touch electrode blocks T12 at the edge are respectively electrically connected to the two first touch electrode groups G1 through the first connecting lines L1.

In an implementation, along the second direction X, at least one of the first touch electrode sub-blocks T121 is located between two of the second touch electrode sub-blocks T122. The second touch electrode sub-blocks T122 are electrically connected to the first touch electrode groups G1 through the first connecting lines L1, and the first connecting lines L1 are usually provided at the two sides of the first component region A2 along the second direction X. When the second touch electrode sub-blocks T122 are located in an edge region along the second direction X in the plurality of second touch electrode blocks T12, the second touch electrode sub-blocks T122 are easily and electrically connected to the first connecting lines L1, and thus the power consumption of the first connecting lines L1 is reduced.

For example, as shown in FIG. 7, the second touch region A12 includes four second touch electrode blocks T12. The left second touch electrode block T12 is electrically connected to the first touch electrode group G1 and electrically connected to the first touch pin P1 through the first touch line S1, and the right second touch electrode block T12 is electrically connected to the first touch electrode group G1 and electrically connected to the first touch pin P1 through the first touch line S1. Two middle second touch electrode blocks T12 are not electrically connected to the first touch electrode group G1, and the two second touch electrode blocks T12 each are electrically connected to the first touch pin P1 through a second touch line S2. Different touch lines are connected to different first touch pins P1.

Figure 8:
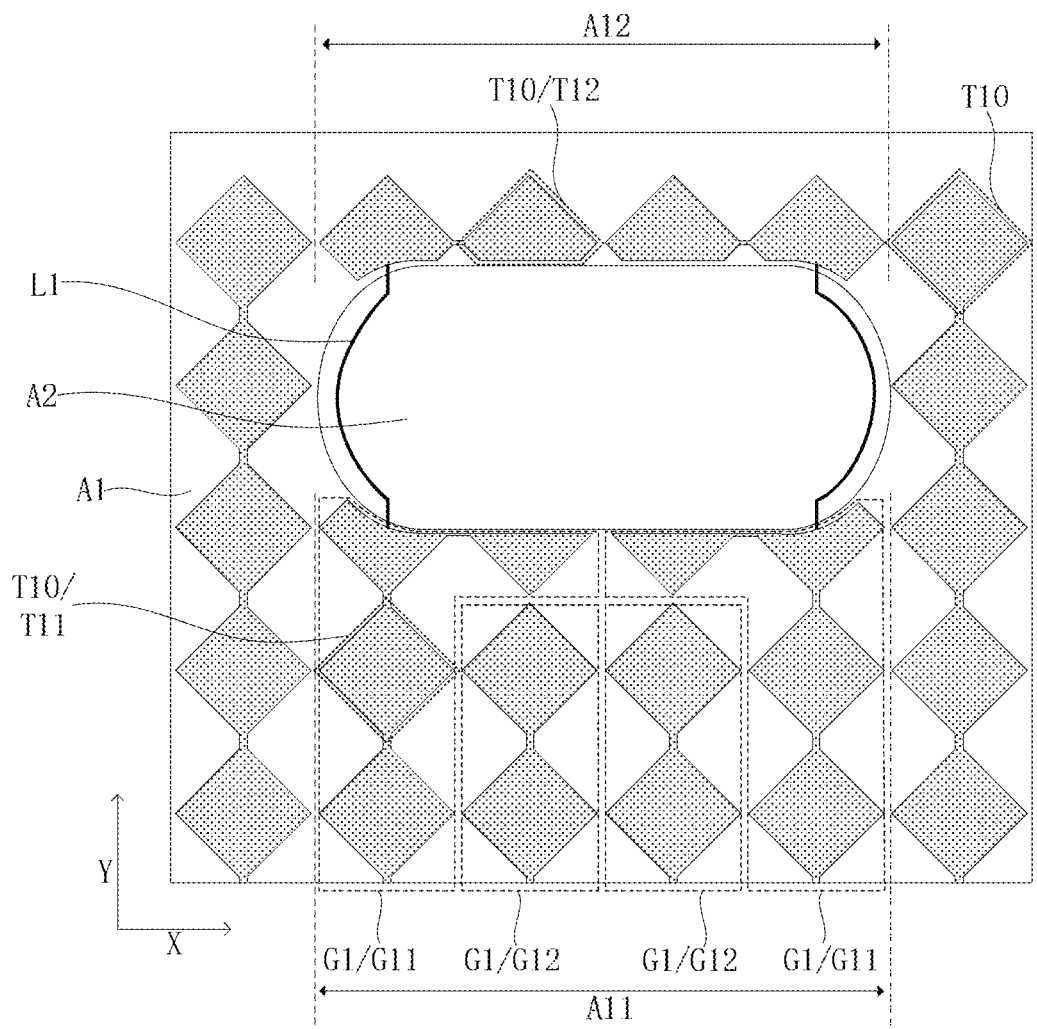
FIG. 8 is a schematic partial view of the touch panel shown in FIG. 1 according to an embodiment of the present disclosure.

FIG. 8 is a schematic partial view of the touch panel shown in FIG. 1.

In an embodiment of the present disclosure, as shown in FIG. 8, at least one of the first touch electrode groups G1 includes at least two of the first touch electrode blocks T11 close to the first component region A2 and arranged along the second direction X. For example, as shown in FIG. 8, the touch panel 01 includes four first touch electrode groups G1. The four first touch electrode groups G1 are arranged generally along the second direction X. The four first touch electrode groups G1 each include the first touch electrode blocks T11 arranged along the first direction Y and electrically connected. However, the left first touch electrode group G1 further includes the first touch electrode block T11 along the second direction X, and the right first touch electrode group G1 further includes the first touch electrode block T11 along the second direction X.

In a technical solution of the present disclosure, at least two first touch electrode blocks T11 located in a same touch electrode group G1 and arranged along the second direction X may be provided close to the first component region A2. For the sake of the avoidance for the first component region A2, when the first touch electrode blocks T11 close to the first component region A2 in the first touch region A11 have a small area, at least two first touch electrode blocks T11 close to the first component region A2 can be electrically connected together.

In an embodiment, irregular first-type touch electrode blocks T10 are not included in many first touch electrode groups G1, and the touch performance of different first touch electrode groups G1 is compensated easily.

Figure 9:
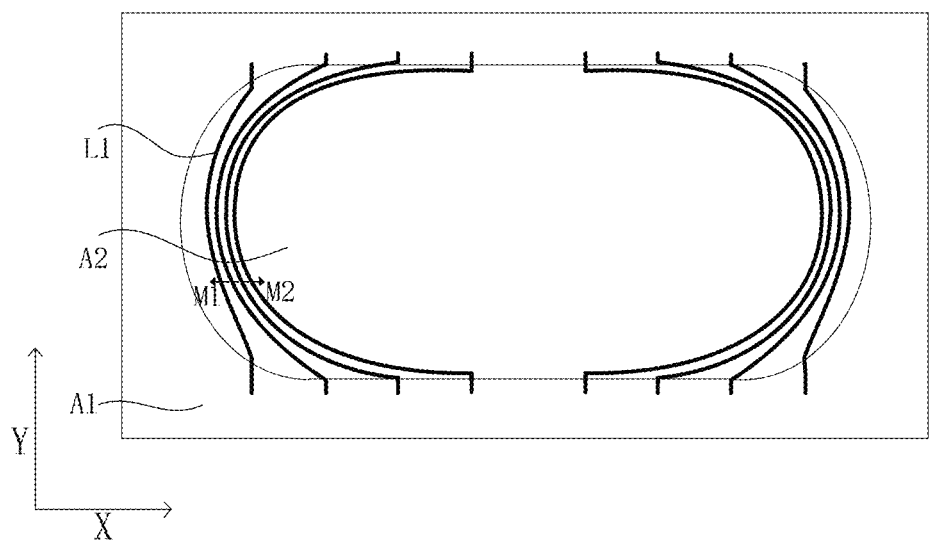
FIG. 9 is a schematic view of a trace of a first connecting line according to an embodiment of the present disclosure.
Figure 10:
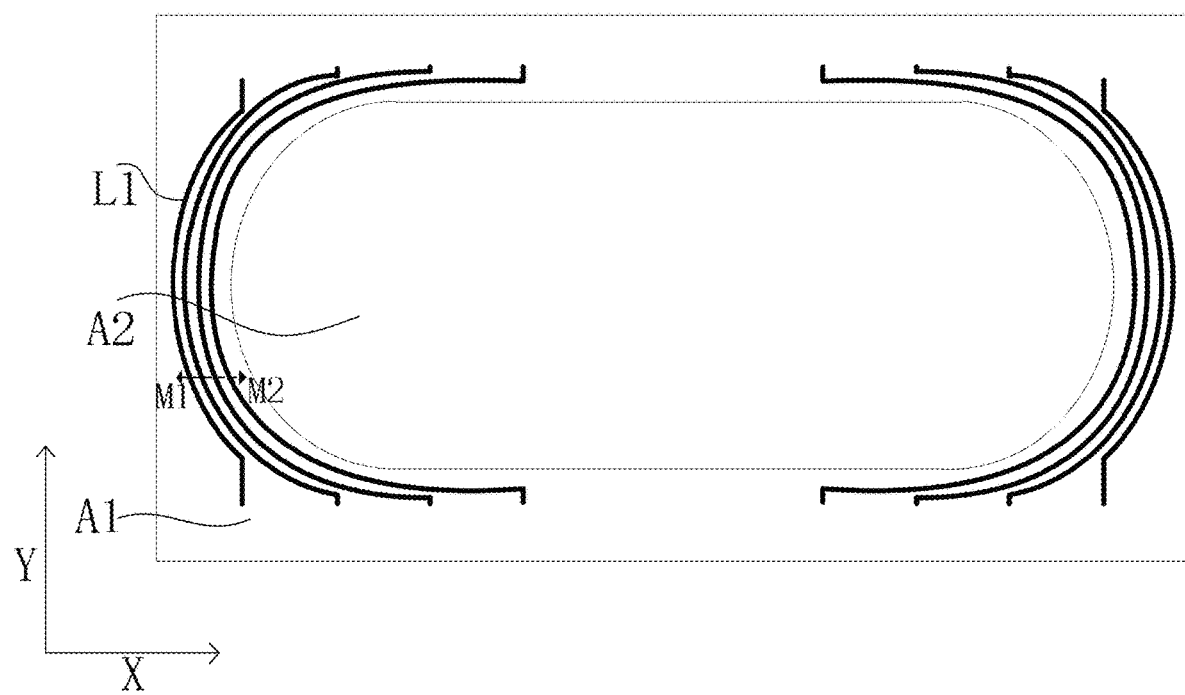
FIG. 10 is a schematic view of a trace of a first connecting line according to an embodiment of the present disclosure.
Figure 11:
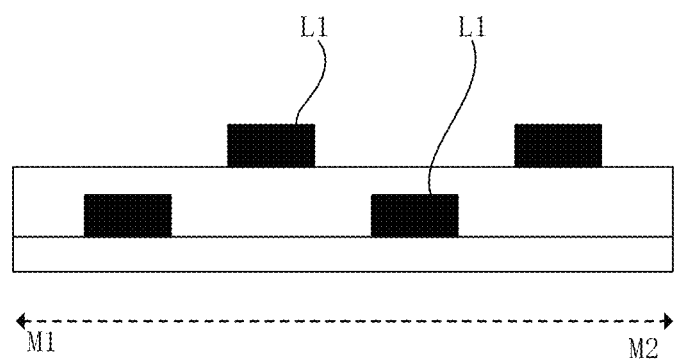
FIG. 11 is a schematic cross-sectional view along a direction M1-M2 shown in FIG. 9 and FIG. 10 according to an embodiment of the present disclosure.

FIG. 9 is a schematic view of a trace of a first connecting line according to an embodiment of the present disclosure. FIG. 10 is a schematic view of a trace of a first connecting line according to an embodiment of the present disclosure. FIG. 11 is a schematic cross-sectional view along a direction M1-M2 shown in FIG. 9 and FIG. 10.

In an embodiment of the present disclosure, as shown in FIG. 9 and FIG. 10, 2≤m2, namely there are at least two first connecting lines L1. Referring to FIG. 11, FIG. 9 and FIG. 10, at least two of the first connecting lines L1 are provided stepwise in different layers, namely when there are at least two first connecting lines L1, the at least two first connecting lines L1 are located on different layers.

By providing at least two first connecting lines L1 on different layers, while the first connecting lines L1 do not take up a large footprint, the first connecting lines L1 can be wider, thereby reducing an impedance of the first touch electrodes T1, and increasing a capacitance of the first touch electrodes T1.

In a technical solution of the present disclosure, adjacent ones of the first connecting lines L1 are provided stepwise in different layers.

In an embodiment of the present disclosure, as shown in FIG. 9, the first connecting lines L1 may be arranged in the first component region A2. Further, the first connecting lines L1 may be arranged at a position close to an edge of the first component region A2.

In an embodiment of the present disclosure, as shown in FIG. 10, the first connecting lines L1 may be arranged out of the first component region A2.

In an embodiment of the present disclosure, at least one of the first connecting lines L1 may be arranged in the first component region A2, and at least one of the first connecting lines L1 may be arranged out of the first component region A2.

Figure 12:
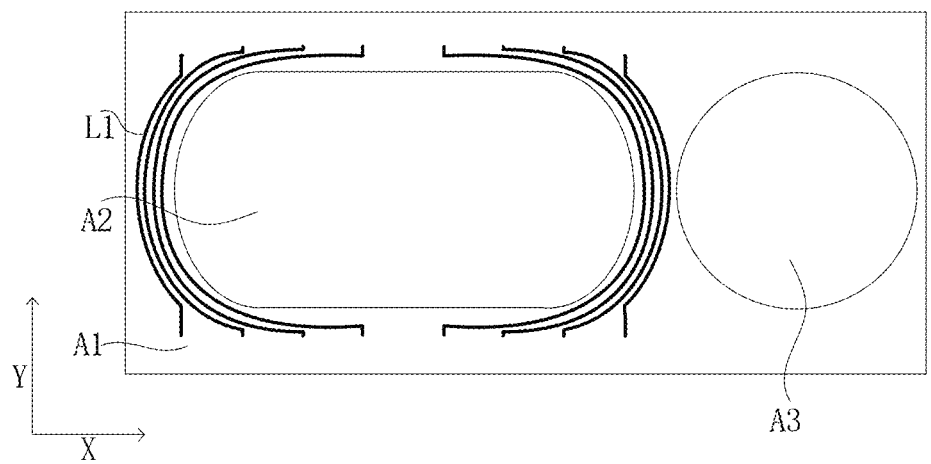
FIG. 12 is a schematic partial view of a touch panel according to an embodiment of the present disclosure.
Figure 13:
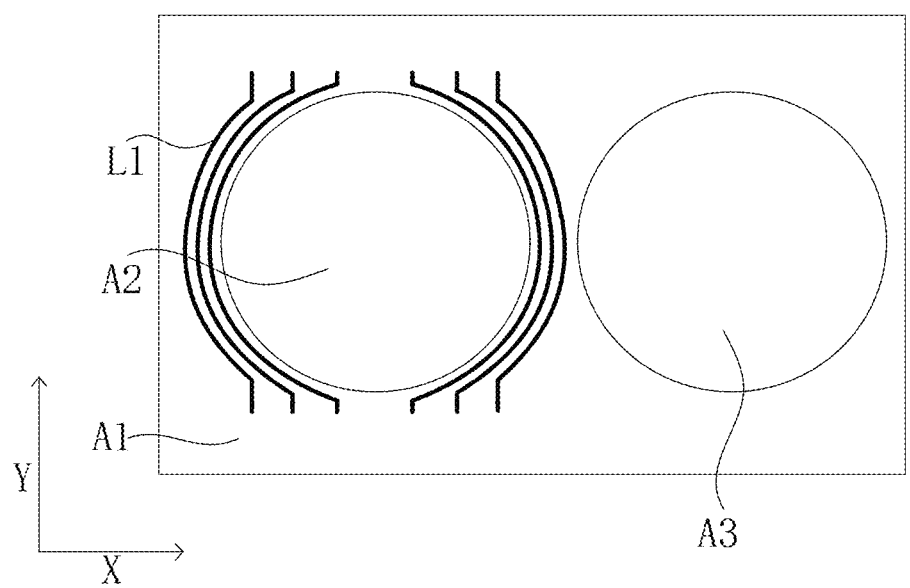
FIG. 13 is another schematic partial view of a touch panel according to an embodiment of the present disclosure.

FIG. 12 is a schematic partial view of a touch panel according to an embodiment of the present disclosure. FIG. 13 is another schematic partial view of a touch panel according to an embodiment of the present disclosure.

In an embodiment of the present disclosure, as shown in FIG. 12 and FIG. 13, the touch panel 01 further includes a second component region A3. The second component region A3 and the first component region A2 are arranged along the second direction X. The touch region A1 at least partially surrounds the second component region A3. The second component region A3 is mainly configured to provide an optical component. For example, an optical sensor, a camera, a face recognition sensor, a flash lamp, a light source (torch) and the like may be provided under the first component region A3. The second component region A3 may be provided in various ways. For example, the second component region A3 includes a through hole or a blind hole.

In terms of a shape, the second component region A3 may be the same as the first component region A2, and may also be different from the first component region A2.

For example, as shown in FIG. 12, a width of the first component region A2 along the second direction X is greater than a width along the first direction Y. A width of the second component region A3 along the second direction X is the same as a width along the first direction Y. In some embodiments, the width of the first component region A2 along the first direction Y may be the same as the width of the second component region A3 along the first direction Y.

For example, as shown in FIG. 13, the width of the first component region A2 along the second direction X is the same as the width along the first direction Y. The width of the second component region A3 along the second direction X is the same as the width along the first direction Y. Further, the width of the first component region A2 along the first direction Y is the same as the width of the second component region A3 along the first direction Y. The width of the first component region A2 along the second direction X is the same as the width of the second component region A3 along the second direction X.

In a technical solution of the present disclosure, as shown in FIG. 12 and FIG. 13, when the touch panel 01 includes the first component region A2 and the second component region A3, at least one of the first connecting lines L1 is provided at a side of the first component region A2 close to the second component region A3.

In an implementation, as shown in FIG. 12 and FIG. 13, at least one of the first connecting lines L1 is provided between the first component region A2 and the second component region A3. In response to a small distance between the first component region A2 and the second component region A3, a region therebetween may not be provided with the touch electrode, but with the first connecting line L1. This can reduce a footprint of the first connecting line L1 in the touch region A1.

In a technical solution of the present disclosure, as shown in FIG. 12 and FIG. 13, when the touch panel 01 includes the first component region A2 and the second component region A3, at least one of the first connecting lines L1 is provided at a side of the first component region A2 away from the second component region A3.

In an implementation, as shown in FIG. 12 and FIG. 13, at least one of the first connecting lines L1 is provided at the side of the first component region A2 close to the second component region A3, and at least one of the first connecting lines L1 is provided at the side of the first component region A2 away from the second component region A3.

By dispersedly providing the first connecting lines L1 at the two relative sides of the first component region A2, the first connecting lines L1 can be laid more easily, and the first connecting lines L1 can be wider.

Figure 14:
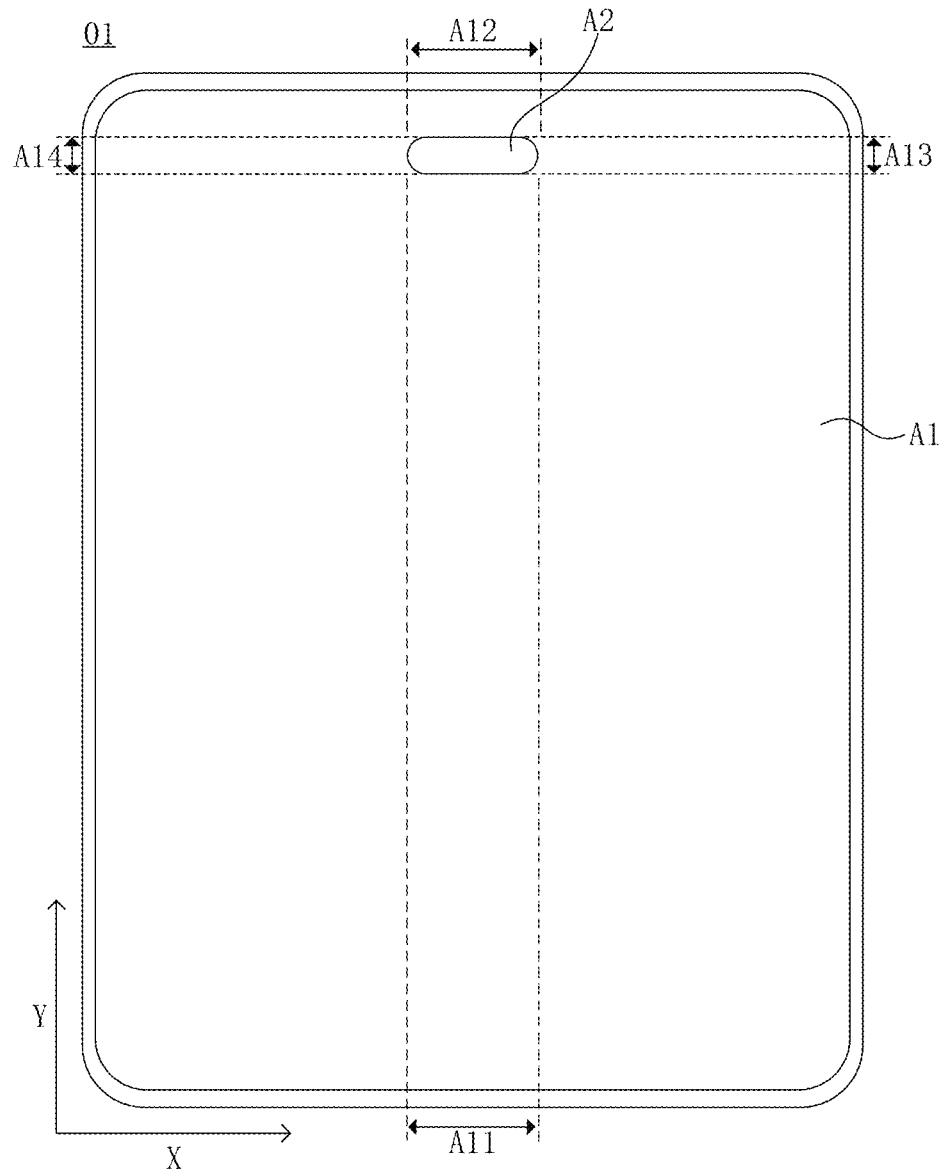
FIG. 14 is another schematic view of a touch panel according to an embodiment of the present disclosure.
Figure 16:
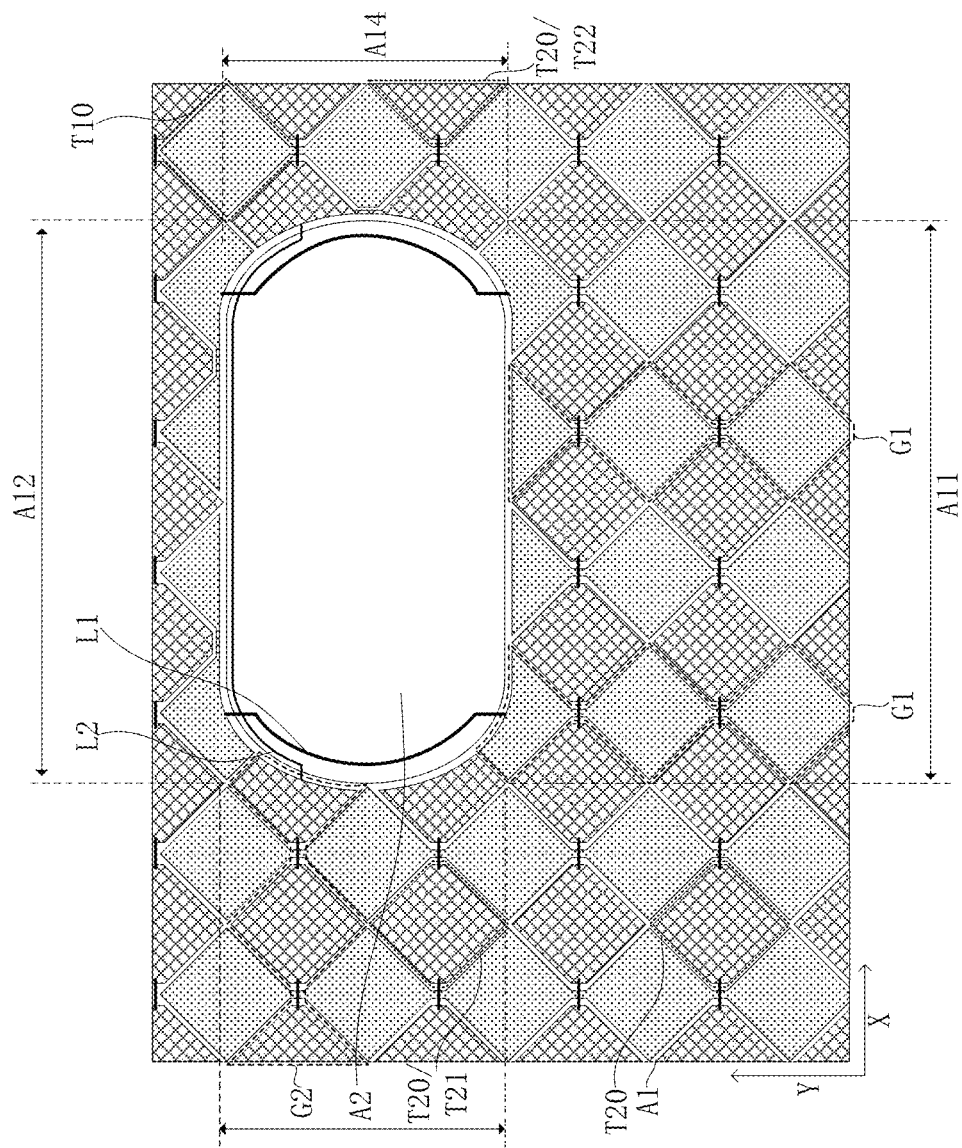
FIG. 16 is a schematic partial view of the touch panel shown in FIG. 14 according to an embodiment of the present disclosure.

FIG. 14 is another schematic view of a touch panel according to an embodiment of the present disclosure. FIG. 16 is a schematic partial view of the touch panel shown in FIG. 14.

In an embodiment of the present disclosure, the touch region A1 includes a third touch region A13 and a fourth touch region A14. The third touch region A13 and the fourth touch region A14 are respectively located at two sides of the first component region A2. It is to be understood that two regions located at the two relative sides of the first component region A2 in the touch region A1 and arranged with the first component region A2 along the second direction X can be respectively referred to as the third touch region A13 and the fourth touch region A14.

It is to be noted that a width of the third touch region A13 along the first direction Y may be equal to a width of the fourth touch region A14 along the first direction Y, and both the width of the third touch region A13 and the width of the fourth touch region A14 along the first direction Y may be equal to or slightly greater than the width of the first component region A2 along the first direction Y.

Figure 15:
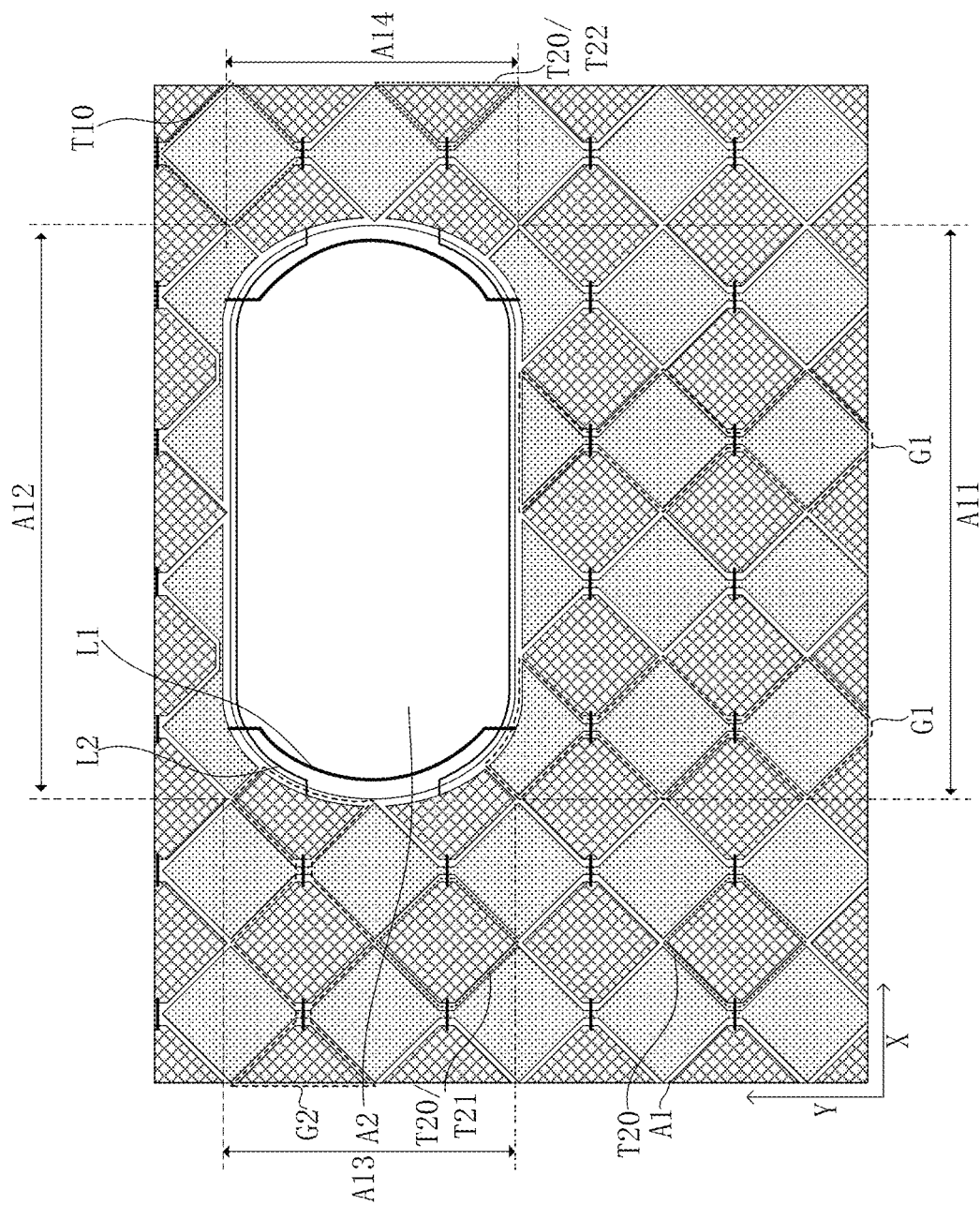
FIG. 15 is a schematic partial view of the touch panel shown in FIG. 14 according to an embodiment of the present disclosure.

FIG. 15 is a schematic partial view of the touch panel shown in FIG. 14.

Referring to FIG. 14 and FIG. 15, the touch panel 01 further includes a plurality of second-type touch electrode blocks T20. The second-type touch electrode blocks T20 are one of the main structures for realizing the touch detection. The plurality of second-type touch electrode blocks T20 are functionally identical touch electrode blocks in the touch detection. For example, the plurality of second-type touch electrode blocks T20 are configured to receive and transmit a touch driving signal. In an embodiment, the plurality of second-type touch electrode blocks T20 are configured to receive and transmit a touch sensing signal. Specifically, the second-type touch electrode blocks T20 each may be a touch driving electrode block, or the second-type touch electrode blocks T20 each may also be a touch sensing electrode block.

The first-type touch electrode block T10 and the second-type touch electrode block T20 are functionally different touch electrode blocks in the touch detection. For example, in the first-type touch electrode block T10 and the second-type touch electrode block T20, one may be the touch driving electrode block, while the other may be the touch sensing electrode block.

The plurality of second-type touch electrode blocks T20 provided by the touch panel 01 include third touch electrode blocks T21 and fourth touch electrode blocks T22. The third touch electrode blocks T21 are located in the third touch region A13. The fourth touch electrode blocks T22 are located in the fourth touch region A14. In other words, the second-type touch electrode blocks T20 are arranged in the third touch region A13 and the fourth touch region A14. According to positions of the second-type touch electrode blocks T20, the plurality of second-type touch electrode blocks T20 are divided into at least two categories: one category is the third touch electrode blocks T21 and is located in the third touch region A13; and the other category is the fourth touch electrode blocks T22 and is located in the fourth touch region A14.

Referring to FIG. 15, the third touch region A13 includes n1 second touch electrode groups G2 arranged along the first direction Y, and the second touch electrode groups G2 each include a plurality of the third touch electrode blocks T21 arranged along the second direction X and electrically connected to each other, n1 being a positive integer greater than or equal to 1. For example, referring to FIG. 15, n1=2, namely the third touch region A13 includes two second touch electrode groups G2 arranged along the row direction. The second touch electrode groups G2 each include at least two third touch electrode blocks T21 arranged along the second direction X and electrically connected together.

Referring also to FIG. 15, the touch panel 01 further includes second connecting lines L2. The second connecting lines L2 are respectively electrically connected to the second touch electrode groups G2 and the fourth touch electrode blocks T22, namely the second connecting lines L2 are configured to electrically connect the second touch electrode groups G2 in the third touch region A13 and the fourth touch electrode blocks T22 in the fourth touch region A14 together.

There are n2 second connecting lines L2, n2 being an integer greater than or equal to and n2≤n1. In the embodiment of the present disclosure, a number of the second connecting lines L2 for electrically connecting the second touch electrode groups G2 in the third touch region A13 and the fourth touch electrode blocks T22 in the fourth touch region A14 is less than or equal to a number of the second touch electrode groups G2 in the third touch region A13.

In an embodiment of the present disclosure, as shown in FIG. 15, n2=n1, namely the number of the second connecting lines L2 is the same as the number of the second touch electrode groups G2. The second touch electrode groups G2 in the third touch region A13 are respectively electrically connected to the second-type touch electrode blocks T20 in the fourth touch region A14 through the second connecting lines L2.

As shown in FIG. 15, in the embodiment of the present disclosure, the width of the first component region A2 along the second direction X is greater than the width along the first direction Y. There are a small number of the second touch electrode groups G2 at the two sides of the first component region A2 along the second direction X. Therefore, the second touch electrode groups G2 can be respectively electrically connected to the second-type touch electrode blocks T20 in the fourth touch region A14 through the second connecting lines L2, and there is no need to provide excessive second connecting lines L2.

In an embodiment of the present disclosure, as shown in FIG. 16, n2<n1, namely the number of the second connecting lines L2 is less than the number of the second touch electrode groups G2. At least one of the second touch electrode groups G2 in the third touch region A13 is electrically connected to the second-type touch electrode block T20 in the fourth touch region A14 through the second connecting line L2, and at least one of the second touch electrode groups G2 in the third touch region A13 is not electrically connected to the second-type touch electrode block T20 in the fourth touch region A14.

Figure 17:
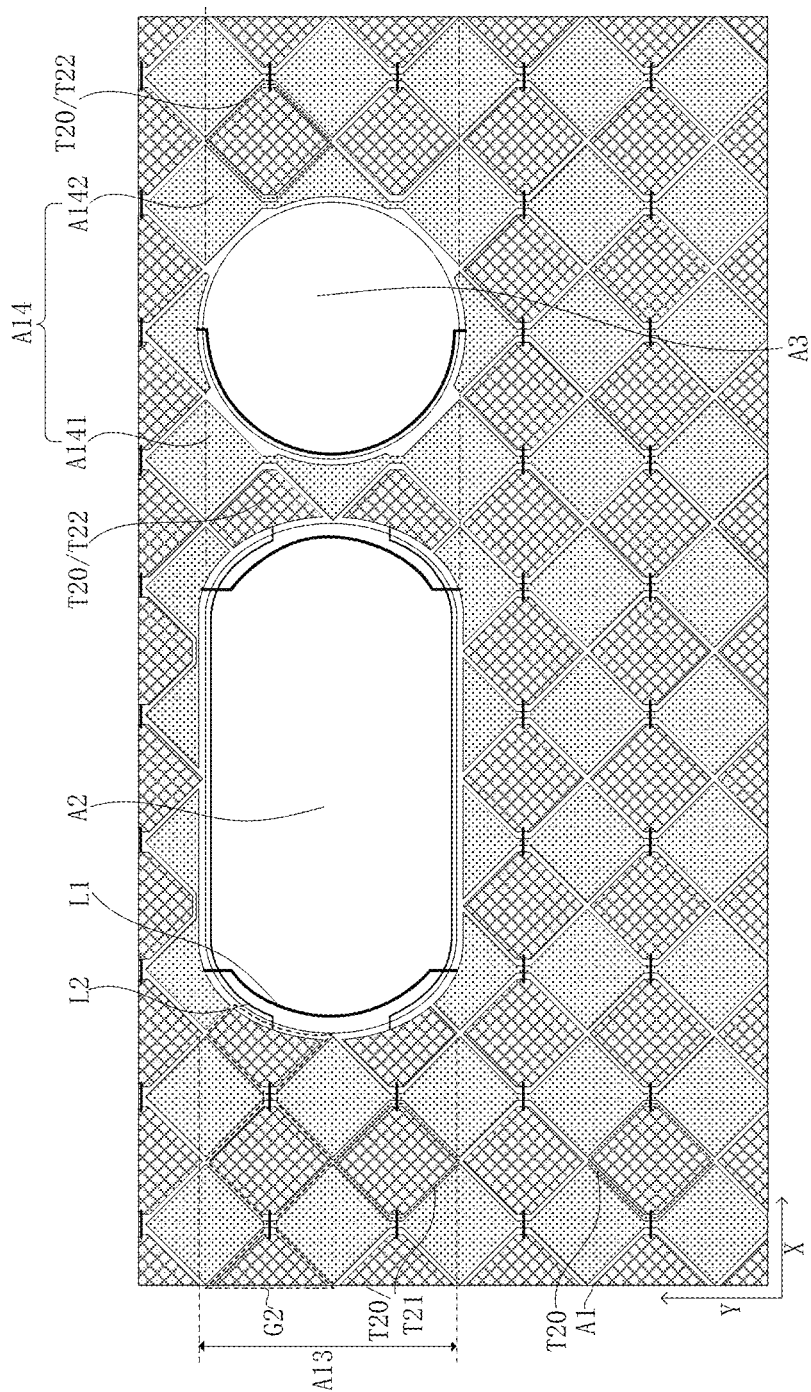
FIG. 17 is another schematic partial view of a touch panel according to an embodiment of the present disclosure.
Figure 18:
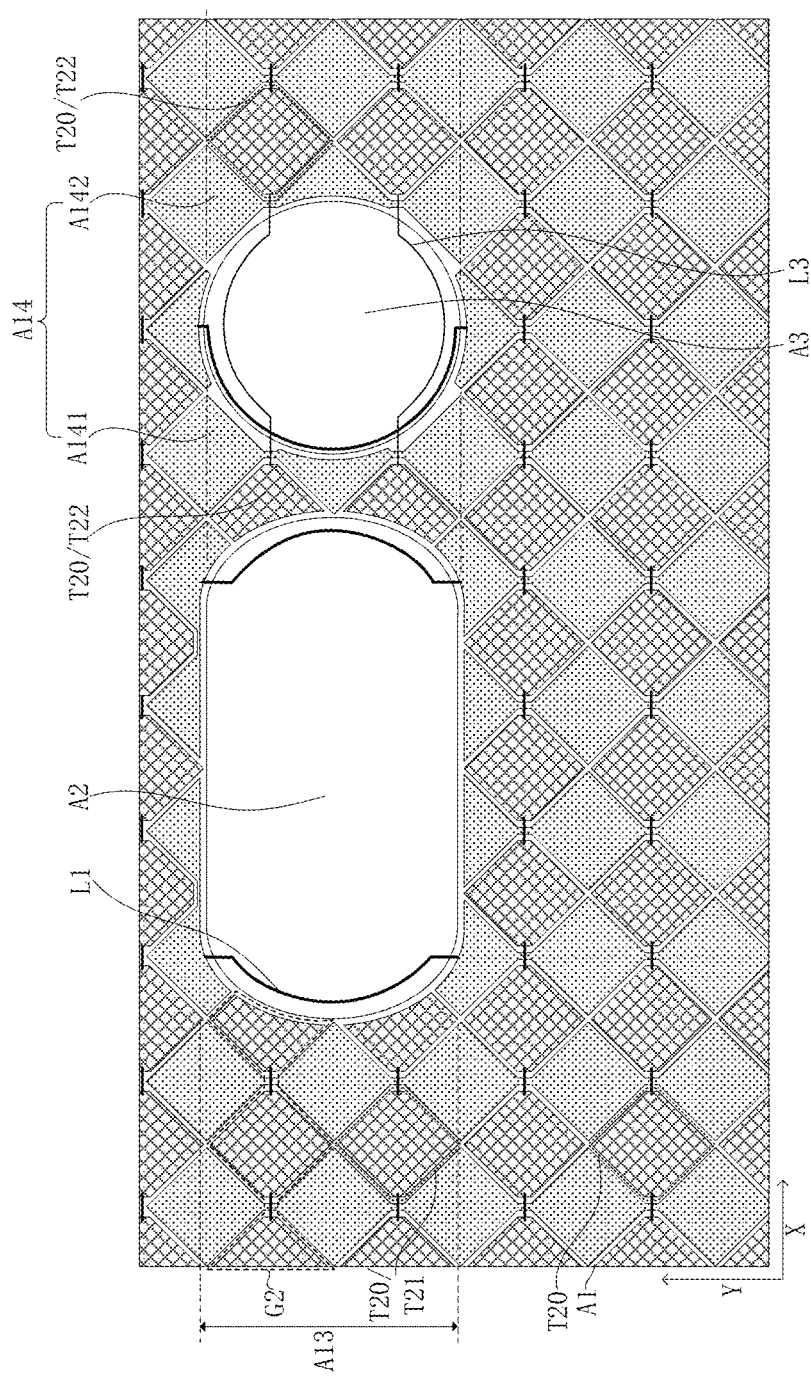
FIG. 18 is another schematic partial view of a touch panel according to an embodiment of the present disclosure.

FIG. 17 is another schematic partial view of a touch panel according to an embodiment of the present disclosure. FIG. 18 is another schematic partial view of a touch panel according to an embodiment of the present disclosure.

As shown in FIG. 17 and FIG. 18, when the touch panel 01 further includes the second component region A3. The second component region A3 and the first component region A2 are arranged along the second direction X. The fourth touch region A14 includes a first touch sub-region A141 and a second touch sub-region A142. The first touch sub-region A141 is located between the first component region A2 and the second component region A3. The second touch sub-region A142 is located at a side of the second component region A3 away from the first component region A2. That is, the fourth touch region A14 includes a region between the first component region A2 and the second component region A3 and a region at the side of the second component region A3 away from the first component region A2.

In an embodiment of the present disclosure, referring to FIG. 17, the fourth touch electrode blocks T22 in the first touch sub-region A141 are electrically connected to the second touch electrode groups G2 in the third touch region A13 through the second connecting lines L2.

Further, the fourth touch electrode blocks T22 in the first touch sub-region A141 are electrically insulated from the fourth touch electrode blocks A22 in the second touch sub-region A22.

In an embodiment of the present disclosure, as shown in FIG. 18, the fourth touch electrode blocks A22 in the first touch sub-region A141 are electrically insulated from the second touch electrode groups G2 in the third touch region A13.

Further, the fourth touch electrode blocks T22 in the first touch sub-region A141 are electrically connected to the fourth touch electrode blocks T22 in the second touch sub-region A142. As shown in FIG. 18, the fourth touch electrode blocks T22 in the fourth touch sub-region A141 are electrically connected to the fourth touch electrode blocks T22 in the second touch sub-region A142 through third connecting lines L3.

Figure 19:
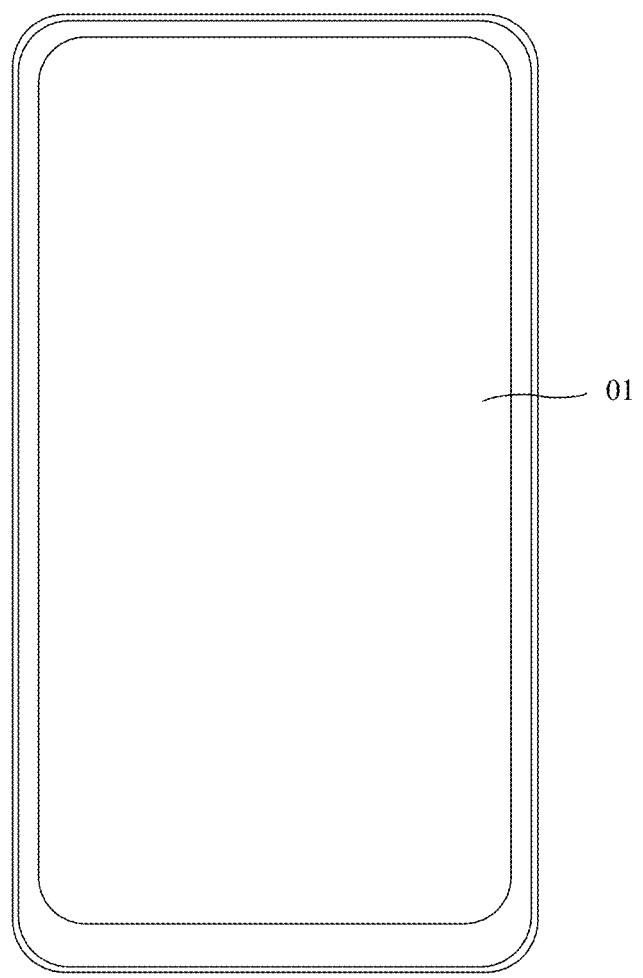
FIG. 19 is a schematic view of a display apparatus according to an embodiment of the present disclosure.

FIG. 19 is a schematic view of a display apparatus according to an embodiment of the present disclosure.

In an embodiment of the present disclosure, as shown in FIG. 19, a display apparatus is provided. The display apparatus includes the touch panel 01 provided in any one of the above embodiments. The touch panel 01 can be stacked with a display panel having a display function. The touch panel 01 may also be integrated with the display function.

For example, the display apparatus may be an electronic device such as a mobile phone, a computer, an intelligent wearable device (for example, a smart watch), and an in-vehicle display apparatus. This is not limited in the embodiments of the present disclosure.

In the embodiment of the present disclosure, the number of the first connecting lines L1 on the touch panel 01 of the display apparatus is less than the number of the first touch electrode groups G1 in the first touch region A11. With the less first connecting lines L1, the present disclosure can make the first connecting lines L1 laid more easily.

The above descriptions are merely exemplary embodiments of the present disclosure and are not intended to limit the present disclosure. Any modification, equivalent replacement and improvement within the principle of the present disclosure shall be included within the protection scope of the present disclosure.

What is claimed is:

1. A touch panel, having a first component region and a touch region, and comprising:
   a plurality of first-type touch electrode blocks, the plurality of first-type touch electrode blocks comprising first touch electrode blocks and second touch electrode blocks; wherein the touch region at least partially surrounds the first component region; the touch region comprises a first touch region and a second touch region; the first touch region and the second touch region are respectively located at two sides of the first component region along a first direction; the first touch electrode blocks are located in the first touch region; the second touch electrode blocks are located in the second touch region; and first touch electrode groups arranged in the first region along a second direction, a number of the first touch electrode groups is m1, and one of the first touch electrode groups comprises at least two of the first touch electrode blocks arranged along the first direction and electrically connected to each other, m1 being a positive integer greater than or equal to 2;
   m2 first connecting lines, wherein one of the m2 first connecting lines is electrically connected to both one first touch electrode group of the first touch electrode groups and one second touch electrode block of the second touch electrode blocks, m2 being an integer greater than or equal to 0, and m2<m1; and
   wherein the first touch electrode groups comprise at least one first touch electrode group that is not electrically connected to the second touch electrodes through the first connecting lines.

2. The touch panel according to claim 1, wherein 2≤m2, and at least two of the m2 first connecting lines are provided stepwise in different layers.

3. The touch panel according to claim 1, further having a second component region, wherein the second component region and the first component region are arranged along the second direction, and the touch region at least partially surrounds the second component region; and
   at least one of the m2 first connecting lines is provided at a side of the first component region away from the second component region, and at least one of the m2 first connecting lines is provided at a side of the first component region close to the second component region.

4. The touch panel according to claim 1, wherein at least adjacent ones of the second touch electrode blocks along the second direction are electrically connected to each other.

5. The touch panel according to claim 4, wherein the first touch electrode group comprises at least one first touch electrode A group; and at least two of the second touch electrode blocks are adjacent to each other along the second direction and electrically connected to each other and are electrically connected to one of the at least one first touch electrode A group through one of the m2 first connecting lines.

6. The touch panel according to claim 5, wherein the at least one first touch electrode A group comprises at least two touch electrode A groups, wherein different first touch electrode A groups of the at least two touch electrode A groups are electrically connected to a same number of second touch electrode blocks of the second touch electrode blocks.

7. The touch panel according to claim 1, wherein at least one of the first touch electrode groups each comprises at least two of the first touch electrode blocks close to the first component region and arranged along the second direction.

8. The touch panel according to claim 1, further comprising:
   second-type touch electrode blocks, wherein the second-type touch electrode blocks comprise third touch electrode blocks and fourth touch electrode blocks; and
   the touch region comprises a third touch region and a fourth touch region; the third touch region and the fourth touch region are respectively located at two sides of the first component region along the second direction; the third touch electrode blocks are located in the third touch region; the fourth touch electrode blocks are located in the fourth touch region; and n1 second touch electrode groups arranged along the first direction are arranged in the third touch region, and one of the second touch electrode groups comprises at least two of the third touch electrode blocks arranged along the second direction and electrically connected to each other, n1 being a positive integer greater than or equal to 1; and
   n2 second connecting lines, wherein one of the n2 second connecting lines is electrically connected to one of the second touch electrode groups and one of the fourth touch electrode blocks, n2 being an integer greater than or equal to 0, and n2≤n1.

9. The touch panel according to claim 8, further having a second component region, wherein the second component region and the first component region are arranged along the second direction, and the touch region at least partially surrounds the second component region;
   the fourth touch region comprises a first touch sub-region and a second touch sub-region; the first touch sub-region is located between the first component region and the second component region; and the second touch sub-region is located at a side of the second component region away from the first component region; and one fourth touch electrode block of the fourth touch electrode blocks in the first touch sub-region is electrically connected to one second touch electrode group of the second touch electrode groups that is located in the third touch region through one of the n2 second connecting lines, and the fourth touch electrode block is electrically insulated from at least one fourth touch electrode block of the fourth touch electrode blocks that is located in the second touch sub-region.

10. The touch panel according to claim 8, further having a second component region, wherein the second component region and the first component region are arranged along the second direction, and the touch region at least partially surrounds the second component region;

the fourth touch region comprises a first touch sub-region and a second touch sub-region; the first touch sub-region is located between the first component region and the second component region; and the second touch sub-region is located at a side of the second component region away from the first component region; and one fourth touch electrode block of the fourth touch electrode blocks in the first touch sub-region is electrically insulated from at least one second touch electrode group of the second touch electrode groups that is located in n the third touch region, and the fourth touch electrode block is electrically connected to another fourth touch electrode of the fourth touch electrodes that is located in the second touch sub-region.

11. A display apparatus, comprising the touch panel according to claim 1.

12. The display apparatus according to claim 11, wherein 2≤m2, and at least two of the m2 first connecting lines are provided stepwise in different layers.

13. The display apparatus according to claim 11, wherein at least adjacent ones of the second touch electrode blocks along the second direction are electrically connected to each other.

14. The display apparatus according to claim 11, further comprising:

second-type touch electrode blocks, wherein the second-type touch electrode blocks comprise third touch electrode blocks and fourth touch electrode blocks; and the touch region comprises a third touch region and a fourth touch region; the third touch region and the fourth touch region are respectively located at two sides of the first component region along the second direction; the third touch electrode blocks are located in the third touch region; the fourth touch electrode blocks are located in the fourth touch region; and n1 second touch electrode groups arranged along the first direction are arranged in the third touch region, and one of the second touch electrode groups comprises at least two of the third touch electrode blocks arranged along the second direction and electrically connected to each other, n1 being a positive integer greater than or equal to 1; and n2 second connecting lines, wherein one of the n2 second connecting lines is electrically connected to one of the second touch electrode groups and one of the fourth touch electrode blocks, n2 being an integer greater than or equal to 0, and n2≤n1.

15. A touch panel, having a first component region and a touch region, and comprising:

a plurality of first-type touch electrode blocks, the plurality of first-type touch electrode blocks comprising first touch electrode blocks and second touch electrode blocks; wherein the touch region at least partially surrounds the first component region; the touch region comprises a first touch region and a second touch region; the first touch region and the second touch region are respectively located at two sides of the first component region along a first direction; the first touch electrode blocks are located in the first touch region; the second touch electrode blocks are located in the second touch region; and first touch electrode groups arranged in the first region along a second direction, a number of the first touch electrode groups is m1, and one of the first touch electrode groups comprises at least two of the first touch electrode blocks arranged along the first direction and electrically connected to each other, m1 being a positive integer greater than or equal to 2;

m2 first connecting lines, wherein one of the m2 first connecting lines is electrically connected to both one first touch electrode group of the first touch electrode groups and one second touch electrode block of the second touch electrode blocks, m2 being an integer greater than or equal to 0, and m2<m1; and first touch pins, wherein at least one first touch pin of the first touch pins that is respectively electrically connected to at least one of the second touch electrode blocks differs from another first touch pin of the first touch pins that is electrically connected to one first touch electrode group of the first touch electrode groups.

16. The touch panel according to claim 15, wherein m2-0, and each of at least two first touch pins of the first touch pins that are respectively electrically connected to the second touch electrode blocks differs from each of other first touch pins of the first touch pins that are respectively electrically connected to the first touch electrode groups.

17. The touch panel according to claim 15, wherein at least one first touch pin of the first touch pins that is respectively electrically connected to at least one of the second touch electrode blocks differs from each of other first touch pins of the first touch pins that are respectively electrically connected to the first touch electrode groups; and another at least one of the first touch pins that is respectively electrically connected to at least one of the second touch electrode blocks is the same as at least one of the first touch pins that is respectively electrically connected to at least one first touch electrode group of the first touch electrode groups.

18. The touch panel according to claim 17, wherein the second touch electrode blocks comprise first touch electrode sub-blocks and second touch electrode sub-blocks; each of at least two first touch pins of the first touch pins respectively electrically connected to the first touch electrode sub-blocks differs from each of at least two first touch pins of the first touch pins respectively electrically connected to the first touch electrode groups; and both one of the second touch electrode sub-blocks and one of the first touch electrode groups are electrically connected to one of the first touch pins; and at least one of the first touch electrode sub-blocks is located between two of the second touch electrode sub-blocks along the second direction.

19. The touch panel according to claim 17, wherein 0<m2<m1, and both one of the second touch electrode sub-blocks and one of the first touch electrode groups are electrically connected to one of the first touch pins through one of the first connecting lines.

20. A display apparatus, comprising:

a touch panel; and first touch pins, wherein the touch panel has a first component region and a touch region and comprises:

a plurality of first-type touch electrode blocks, the plurality of first-type touch electrode blocks comprising first touch electrode blocks and second touch electrode blocks; wherein the touch region at least partially surrounds the first component region; the touch region comprises a first touch region and a second touch region; the first touch region and the second touch region are respectively located at two sides of the first component region along a first direction; the first touch electrode blocks are located in the first touch region; the second touch electrode blocks are located in the second touch region; and first touch electrode groups arranged in the first region along a second direction, a number of the first touch electrode groups is m1, and one of the first touch electrode groups comprises at least two of the first touch electrode blocks arranged along the first direction and electrically connected to each other, m1 being a positive integer greater than or equal to 2, and m2 first connecting lines, wherein one of the m2 first connecting lines is electrically connected to both one first touch electrode group of the first touch electrode groups and one second touch electrode block of the second touch electrode blocks, m2 being an integer greater than or equal to 0, and m2<m1; and wherein at least one first touch pin of the first touch pins that is respectively electrically connected to at least one of the second touch electrode blocks differs from another first touch pin of the first touch pins that is electrically connected to one first touch electrode group of the first touch electrode groups.

* * * * *